(12) United States Patent
Kobayashi

(10) Patent No.: US 9,948,474 B2
(45) Date of Patent: Apr. 17, 2018

(54) NETWORK SYSTEM, PACKET TRANSMISSION APPARATUS, PACKET TRANSMISSION METHOD, AND RECORDING MEDIUM RECORDING INFORMATION PROCESSING PROGRAM

(71) Applicant: FUJITSU LIMITED, Kawasaki-shi, Kanagawa (JP)

(72) Inventor: Ryu Kobayashi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/635,439

(22) Filed: Mar. 2, 2015

(65) Prior Publication Data
US 2015/0280932 A1  Oct. 1, 2015

(30) Foreign Application Priority Data
Mar. 28, 2014  (JP) .................................. 2014-069627

(51) Int. Cl.
*H04L 12/18* (2006.01)
*H04L 12/761* (2013.01)

(52) U.S. Cl.
CPC .......... *H04L 12/1886* (2013.01); *H04L 45/16* (2013.01)

(58) Field of Classification Search
CPC ..... H04L 12/1886; H04L 45/16; H04L 12/18; H04L 49/252; H04L 49/253; H04L 45/32;
(Continued)

(56) References Cited

U.S. PATENT DOCUMENTS 7,808,993 B2 * 10/2010 Zwiebel .................. H04L 45/16
370/392
7,899,928 B1 * 3/2011 Naik .................... H04L 12/4625
709/238
(Continued)

FOREIGN PATENT DOCUMENTS

JP  2005-229465  8/2005
JP  2005-253026  9/2005
(Continued)

OTHER PUBLICATIONS

Japanese Office Action dated Oct. 17, 2017 for corresponding Japanese Patent Application No. 2014-069627, with English Translation, 6 pages.
(Continued)

*Primary Examiner* — Hanh N Nguyen
(74) *Attorney, Agent, or Firm* — Fujitsu Patent Center

(57) ABSTRACT

A network system includes a plurality of first communication apparatuses that perform multicast routing, and a plurality of second communication apparatuses configured to connect between the plurality of first communication apparatuses and forward a multicast packet from a port other than a receiving port. Each one of the plurality of second communication apparatuses includes a first memory configured to store the receiving port at which an entry request for a multicast group sent by one of the plurality of first communication apparatuses has been received as a forward port for multicast packets for that multicast group, and a forwarding unit configured to forward a multicast packet for the multicast group from the forward port among the ports of the second communication apparatus.

4 Claims, 23 Drawing Sheets

(58) Field of Classification Search
CPC ..... H04L 45/44; H04L 45/34; H04L 12/1863; H04L 12/4625
USPC ................ 370/400, 389, 392, 350, 351, 254
See application file for complete search history.

(56) References Cited

U.S. PATENT DOCUMENTS

| | | | | |
|---|---|---|---|---|
| 8,345,579 | B2 * | 1/2013 | Shiraki | H04L 45/18 370/254 |
| 8,873,552 | B2 * | 10/2014 | Bhagavathiperumal | H04L 12/4641 370/390 |
| 9,203,943 | B2 * | 12/2015 | Xin | H04M 1/24 |
| 9,356,789 | B1 * | 5/2016 | Peter | H04L 12/1863 |
| 2006/0013141 | A1 | 1/2006 | Mutoh et al. | |
| 2008/0175240 | A1 | 7/2008 | Suzuki | |

FOREIGN PATENT DOCUMENTS

| | | |
|---|---|---|
| JP | 2006-033275 | 2/2006 |
| JP | 2007-174489 | 7/2007 |
| JP | 2008-153766 | 7/2008 |
| JP | 2008-177968 | 7/2008 |

OTHER PUBLICATIONS

Cisco IOS Software Configuration Guide, Release 12.2SX, Cisco, Nov. 17, 2013, "Configuring PIM Snooping," Chapter 41, pp. 41-1 to 41-7, URL, https://www.cisco.com/c/en/us/td/docs/switches/lan/catalyst6500/ios/12-2SX/configuration/guide/book.pdf. (Cited in the Office Action of the corresponding Japanese Patent Application No. 2014-069627 dated Oct. 17, 2017).

* cited by examiner

FIG.11

MULTICAST FORWARD DETERMINATION TABLE

| MULTICAST ADDRESS | FORWARDING PORT | AGING TIMER |
|---|---|---|
| 230.0.0.1 | DISCARD | 200sec |
| 230.0.0.10 | PORT 2 | 130sec |
| 231.0.0.10 | PORT 1 | 125sec |
| 231.0.0.10 | PORT 5 | 90sec |

FIG.12

MULTICAST RECEPTION REQUEST MESSAGE

| CONTENT | EXPLANATION |
|---|---|
| RECEPTION REQUESTING NODE | L2SW ADDRESS NOTIFYING RECEPTION OF PIM JOIN MESSAGE |
| MULTICAST ADDRESS | MULTICAST ADDRESS FOR WHICH FORWARD IS REQUESTED (E.G., 230.0.0.1) |
| RECEIVING PORT NUMBER | PORT NUMBER THAT RECEIVED PIM JOIN MESSAGE (E.G., PORT1) |
| VLAN | INFORMATION ON VLAN REQUESTING FORWARD |

FIG.13

MULTICAST RECEPTION SETTING MESSAGE

| CONTENT | EXPLANATION |
|---|---|
| MULTICAST ADDRESS | MULTICAST ADDRESS FOR WHICH FORWARD IS REQUESTED (E.G., 230.0.0.1) |
| VLAN | INFORMATION ON VLAN REQUESTING FORWARD |
| FOEWARDING PORT NUMBER | PORT NUMBER TO FORWARD MULTICAST PACKETS (E.G., PORT2) |
| DISCARDING PORT NUMBER | PORT NUMBER TO DISCARD MULTICAST PACKETS (E.G., ALL EXCEPT PORT2) |

US 9,948,474 B2

NETWORK SYSTEM, PACKET TRANSMISSION APPARATUS, PACKET TRANSMISSION METHOD, AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2014-069627, filed on Mar. 28, 2014, the entire contents of which are incorporated herein by reference.

FIELD

The present invention relates to a network system, a packet transmission apparatus, a packet transmission method, and an information processing program.

BACKGROUND

When a Layer 2 switch (hereinafter "L2SW") receives a multicast packet, it typically forwards the multicast packet from all ports except the receiving port that belong to the same VLAN (Virtual Local Area Network). Forwarding a packet from all the ports of the same VLAN except the receiving port is called flooding.

PATENT DOCUMENT

[Patent document 1] Japanese Patent Laid-Open No. 2007-174489
[Patent document 2] Japanese Patent Laid-Open No. 2005-253026
[Patent document 3] Japanese Patent Laid-Open No. 2008-153766
[Patent document 4] Japanese Patent Laid-Open No. 2008-177968

However, since flooding from an L2SW forwards the multicast packet also from ports which are connected with devices that do not ask for the multicast packet, the bandwidth of lines can be impacted.

SUMMARY

In one aspect, the present invention provides a network system that includes a plurality of first communication apparatuses configured to perform multicast routing; and
a plurality of second communication apparatuses configured to connect between the plurality of first communication apparatuses and forward a multicast packet from a port other than a receiving port,
wherein each one of the plurality of second communication apparatuses includes:
a first memory configured to store the receiving port at which an entry request for a multicast group sent by one of the plurality of first communication apparatuses has been received as a forward port for multicast packets for that multicast group; and
a forwarding unit configured to forward a multicast packet for the multicast group from the forward port among the ports of the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is an example of a multicast forward determination table;
FIG. 12 is a diagram illustrating an example of information contained in a multicast reception request message;
FIG. 13 is a diagram illustrating an example of information contained in a multicast reception setting message.

DESCRIPTION OF EMBODIMENTS

Embodiments of the invention will be described below with reference to drawings. The arrangements of the embodiments described below are illustrative and the present invention is not limited to the arrangements of the embodiments.

<Multicast Network>

Figure 1:
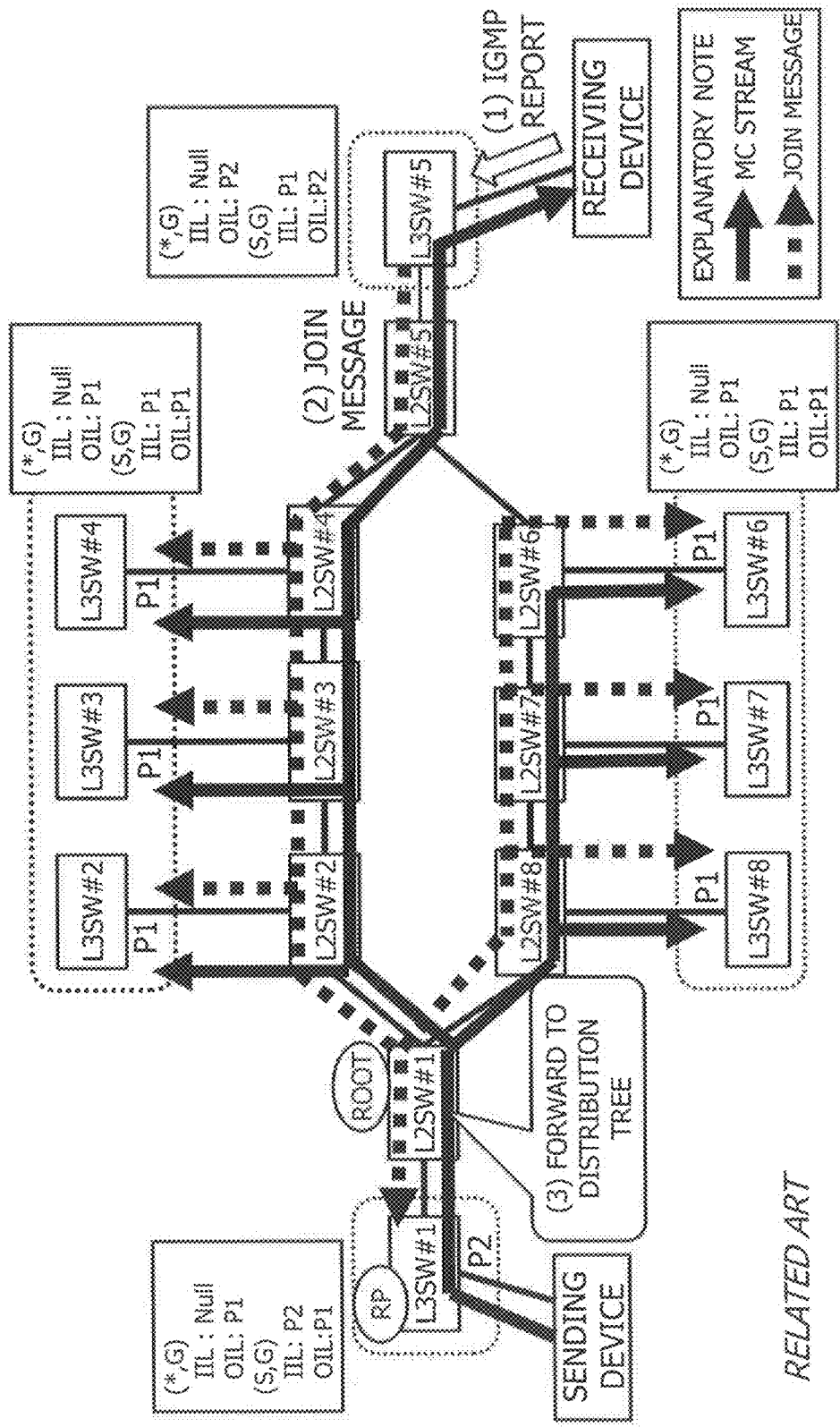
FIG. 1 is a diagram illustrating an exemplary flow of a process relating to entry to a multicast group and distribution of multicast packets.
Figure 2:
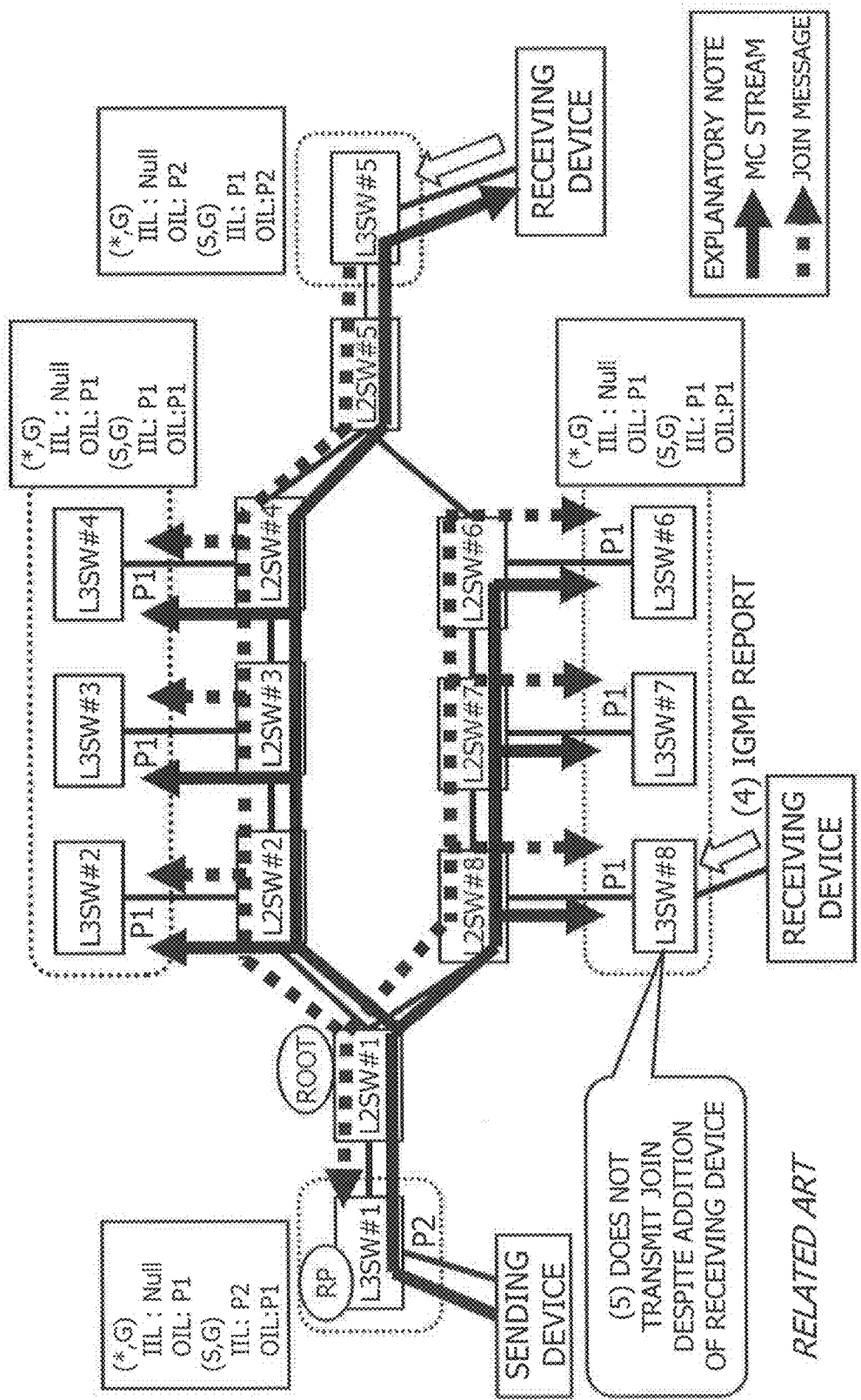
FIG. 2 is a diagram illustrating an exemplary flow of a process for a receiving device below L3SW #8 to newly enter the multicast group.
Figure 3:
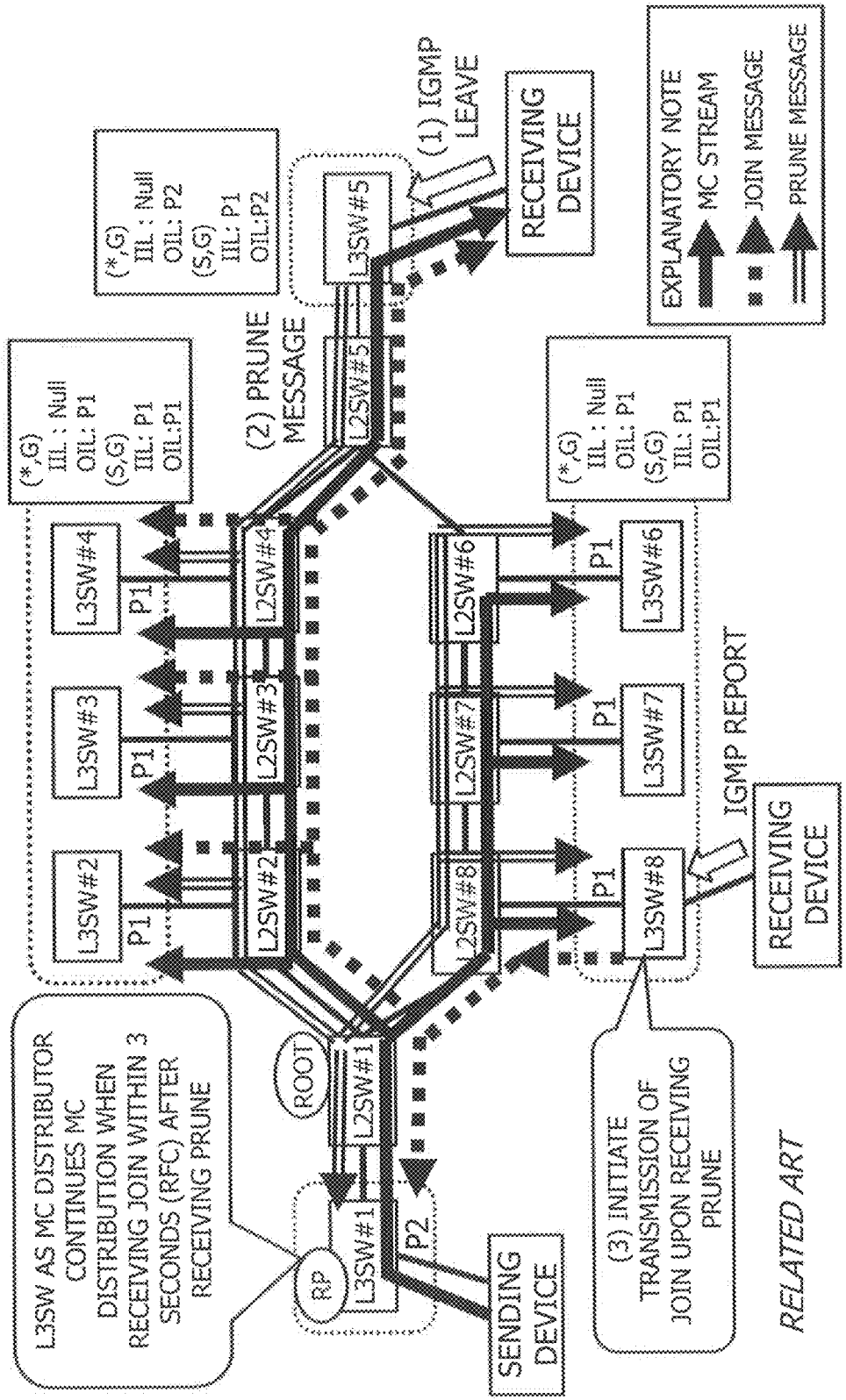
FIG. 3 is a diagram illustrating an exemplary flow of a process for the receiving device below L3SW #5 to withdraw from the multicast group.

FIGS. 1, 2, and 3 illustrate examples of process flows relating to distribution of multicast packets in a multicast network. FIGS. 1, 2, and 3 represent the same network. For the network illustrated in FIGS. 1, 2, and 3, it is assumed that L2SWs are connected by optical lines and an L2SW and an L3SW are connected by a metal line. Additionally, a sending device that sends multicast packets is present below an L3SW #1. It is also supposed that the ports of each L2SW belong to the same VLAN. Hereinbelow, FIGS. 1, 2, and 3 will be described for the same multicast group.

Among L3SWs, PIM-SM (Protocol Independent Multicast-Sparse Mode), a multicast routing protocol, for example, is implemented and route information and the like for multicast packets are exchanged. In the examples illustrated in FIGS. 1, 2, and 3, the rendezvous point (RP) of the multicast distribution tree is the L3SW #1.

Between an L3SW and a host (a receiving device and a sending device), IGMP (Internet Group Management Protocol), for example, is implemented, and information about entry and withdrawal of the host to/from the multicast group is exchanged.

Among L2SWs, TRILL which is a protocol for route redundancy in an L2SW topology, for example, is implemented. In TRILL, after routing for unicast is completed, a multicast distribution tree is formed among L2SWs separately from the multicast routing protocol implemented among L3SWs. In TRILL, when an L2SW receives a multicast packet, the L2SW once forwards it to the root SW, which then distributes the multicast packet downstream in the multicast distribution tree. In the examples illustrated in FIGS. 1, 2, and 3, the root SW of the TRILL multicast distribution tree is L2SW #1.

FIG. 1 is a diagram illustrating an exemplary flow of a process relating to entry to a multicast group and distribution of multicast packets. (1) The receiving device below the L3SW #5 transmits an IGMP report, which is a request to enter a multicast group, in order to enter the multicast group.

(2) Upon receiving the IGMP report from the receiving device below, the L3SW #5 registers the receiving device as a destination of multicast packet distribution for the multicast group specified by the IGMP report. The L3SW #5 also sends a PIM Join message, which is a request to enter the multicast group in question, in order to itself enter the multicast group. The Join message is transmitted hop-by-hop to be delivered to the L3SW which is the RP.

The Join message is a multicast packet destined for a multicast IP address 224.0.0.13, so each L2SW forwards the Join message to the root SW using the TRILL multicast distribution tree. In this process, each L2SW forwards the Join message by flooding it. The Join message transmitted by the L3SW #5 consequently also reaches L3SWs #2 to #4, and #6 to #8, which are not the RP of the multicast group nor do have receiving devices of the multicast group connected below them.

When the Join message reaches the L3SW #1 as the RP, distribution of multicast packets to the L3SW #5 is registered to the RP so that multicast packets start to be distributed to the L3SW #5. From this point onward, the L3SW #5 transmits a Join message at predetermined intervals. The RP continues to distribute multicast packets while it receives the Join message and stops the distribution of multicast packets for the multicast group when it does not receive the Join message for a predetermined period of time. The transmission interval of the Join message is 60 seconds, for example. Also, the predetermined period of time for which no Join message is received by the RP before it decides to stop distribution of multicast packets is three minutes, for example.

(3) When the sending device sends a multicast packet, the L3SW #1 as the RP transmits the multicast packet in accordance with the multicast distribution tree of the corresponding multicast group. Since the L2SW #1, which is the first to receive the multicast packet transmitted by the L3SW #1, is the root SW, it forwards the multicast packet downstream in the TRILL multicast distribution tree. The downstream L2SWs each relays the multicast packet further downstream by flooding it. The multicast packet accordingly also reaches L3SWs #2 to #4, and #6 to #8, which have no receiving device of the multicast group in question connected below them.

FIG. 2 is a diagram illustrating an exemplary flow of a process for the receiving device below the L3SW #8 to newly enter the multicast group. (4) An IGMP report is transmitted by the receiving device below the L3SW #8 which is to newly enter the multicast group. (5) Upon receiving the IGMP report, the L3SW #8 registers the new receiving device as a destination of distribution of relevant multicast packets. As the L3SW #8 has already been receiving multicast packets for the corresponding multicast group, however, it does not send a Join message anew. The L3SW #8 therefore does not send a Join message at the predetermined intervals either.

FIG. 3 is a diagram illustrating an exemplary flow of a process for the receiving device below the L3SW #5 to withdraw from the multicast group. (6) The receiving device below L3SW #5 sends an IGMP Leave, which is a request to withdraw from a multicast group.

(7) Upon receiving the IGMP Leave, the L3SW #5 stops sending down multicast packets because it now has no receiving device of the multicast group in question below it. Also, since the L3SW #5 no longer has to receive multicast packets for the multicast group in question, it sends a PIM Prune message, which is a request to withdraw from the multicast group.

The Prune message is also a multicast packet transmitted to multicast IP address 224.0.0.13, the same as the Join message, as its destination. Each L2SW accordingly relays the Prune message to the L3SW #1, which is the RP by flooding it. The Prune message sent from the L3SW #5 consequently also reaches L3SWs #1 to #4, and #6 to #8.

If the L3SW #1 as the RP does not receive a Join message within three seconds after receiving the Prune message, it stops distribution of multicast packets for the multicast group in question (prescribed by RFC2362). The L3SW #8, however, has a receiving device of the multicast group in question connected below it. Thus, (8) the L3SW #8 transmits a Join message in response to reception of the Prune message in order to make the L3SW #1 as the RP continue distribution of multicast packets. As a result, the L3SW #1 as the RP receives a Join message within three seconds after receiving the Prune message and continues to distribute multicast packets.

This Join message transmitted by the L3SW #8 will reach L3SWs #1 to #7 due to flooding at each L2SW.

In the processes illustrated in FIGS. 1 to 3, the Join message, Prune message, and multicast packets are also delivered to L3SWs #2 to #4, #6, and #7, which are not relevant to distribution of multicast packets. In the first embodiment, L2SWs operate so as not to transfer unneeded packets to devices that are not relevant to distribution of multicast packets.

First Embodiment

FIGS. 4, 5, 6, 7, and 8 are diagrams illustrating exemplary flows of processes relating to multicast packet distribution in a multicast network according to the first embodiment. The structures of the networks illustrated in FIGS. 4 to 8 are similar to that of the network illustrated in FIGS. 1 to 3.

Figure 4:
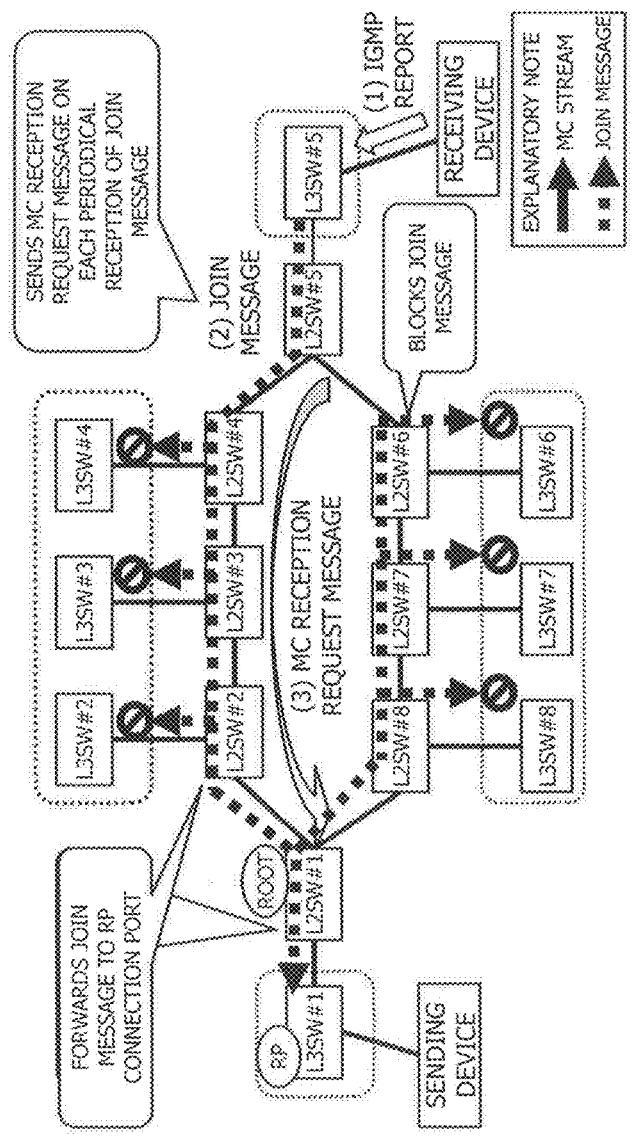
FIG. 4 is a diagram illustrating an exemplary flow of a process relating to entry to a multicast group and distribution of multicast packets according to a first embodiment.

FIG. 4 is a diagram illustrating an exemplary flow of a process relating to entry to a multicast group and distribution of multicast packets according to the first embodiment. (1) The receiving device below the L3SW #5 transmits an IGMP report in order to enter a multicast group.

(2) Upon receiving the IGMP report from the receiving device below, the L3SW #5 registers the receiving device as a destination of distribution of relevant multicast packets and also sends a Join message. (3) Upon receiving the Join message, the L2SW #5 sends a multicast reception request message to the root SW and then forwards the Join message. The multicast reception request message is a message for requesting the root SW to forward multicast packets.

In the first embodiment, each L2SW forwards Join and Prune messages from the port on the side to which the RP is connected and not from the other ports. This prevents forwarding of Join and Prune messages to devices which are not relevant to forwarding of multicast packets.

It is noted that in FIG. 4, the Join message is also delivered from the L2SW #1, i.e., the root SW, to the L2SW #8. This is because of the characteristics of optical lines, by which L2SWs are connected. In a case where L2SWs are connected by metal lines, the Join message is not delivered from the L2SW #1, which is the root SW to the L2SW #8 in the first embodiment.

Note that with regard to the multicast reception request message, the L2SW #5, which receives a Join message from L3SW #5, may create and send a multicast reception request message and the other L2SWs may forward it without creating one. Alternatively, L2SWs #2 to #4, in addition to L2SW #5, may each create and send a multicast reception request message when relaying the Join message. The first embodiment is described on the assumption that an L2SW that has received a Join message from an L3SW creates and sends a multicast reception request message and the other L2SWs forward that multicast reception request message (the former case).

Also, the multicast reception request message may be transmitted as a unicast destined for the root SW or transmitted by multicast by means of a multicast packet such as a BPDU (Bridge Protocol Data Unit), for example. When the multicast reception request message is distributed by multicast, registration may be made in advance such that a packet having the IP address used for multicast reception request messages is forwarded from the port to which another L2SW is connected and not forwarded from the other ports. The first embodiment assumes that a multicast reception request message is transmitted as a unicast destined for the root SW.

Figure 5:
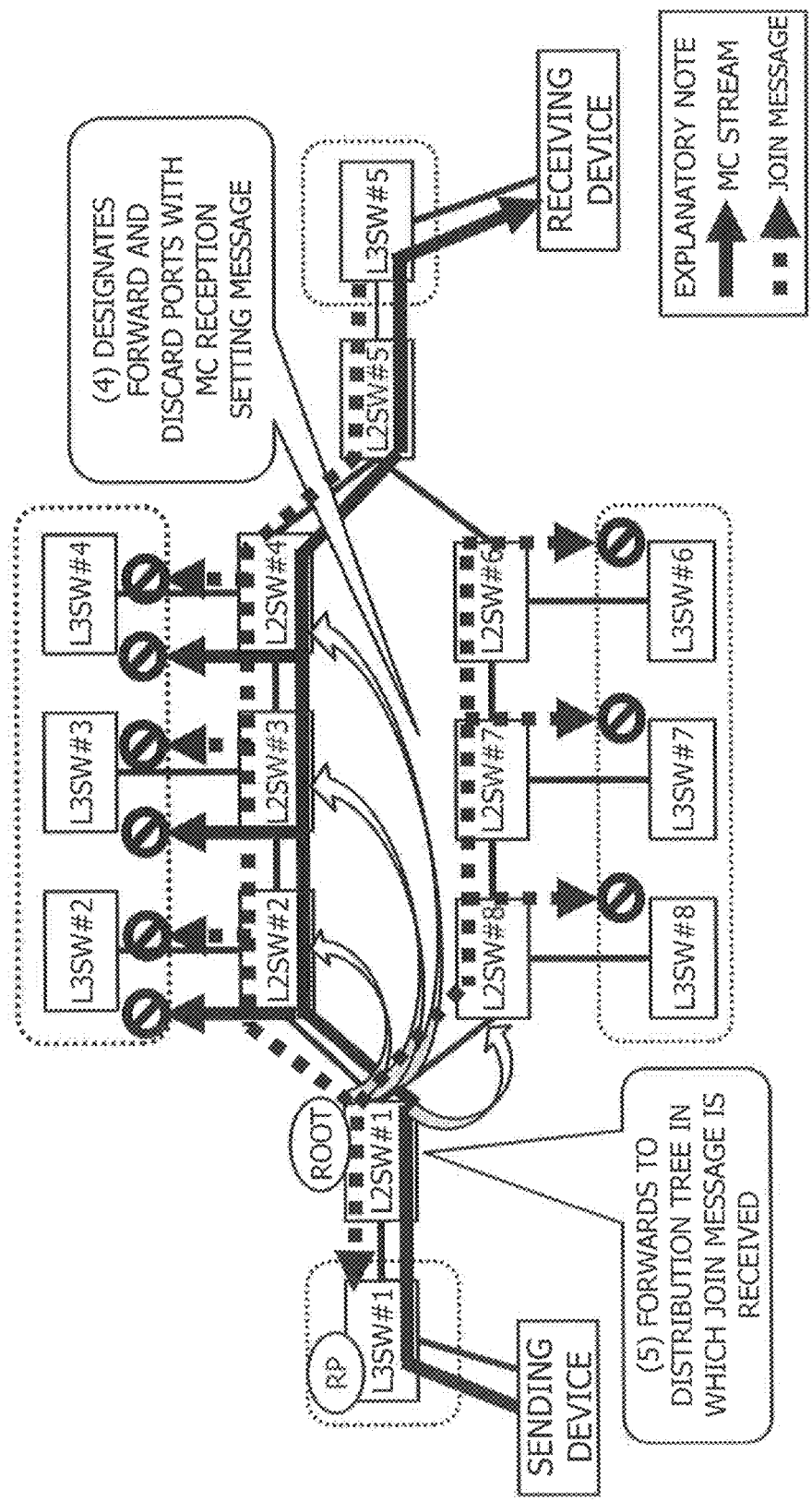
FIG. 5 is a diagram illustrating an exemplary flow of a process after receiving a multicast reception request message at the L2SW #1 as the root SW.

FIG. 5 is a diagram illustrating an exemplary flow of a process after receiving a multicast reception request message at the L2SW #1 as the root SW. (4) The L2SW #1 as the root SW holds relationship of connections among L2SWs in the TRILL multicast distribution tree and determines the route of the Join message based on the received multicast reception request message. The L2SW #1 as the root SW creates and sends a multicast reception setting message that designates a forward port and a discard port for multicast packets for the multicast group in question to the L2SWs in the multicast distribution tree.

The port designated as the forward port in the multicast reception setting message is used for forwarding multicast packets for the corresponding multicast group. As the forward port, the port of each L2SW which received the Join message for the multicast group and which is on the route of the Join message is designated, for example.

Multicast packets for the corresponding multicast group are not forwarded from the port designated as the discard port by the multicast reception setting message. As the discard port, a port of each L2SW that is not on the route of the Join message is designated.

The multicast reception setting message may be transmitted to each L2SW by unicast or transmitted as a multicast packet. When the multicast reception setting message is distributed by multicast, the MAC address used for the multicast reception setting message may be registered beforehand such that the multicast reception setting message is forwarded from the port connected with another L2SW and is not forwarded from the other ports. Also, when the multicast reception setting message is distributed by multicast, information on all of the L2SWs in the multicast distribution tree may be included in it. In addition, the multicast reception setting message may be unicast when the multicast reception request message is unicast and multicast when the multicast reception request message is multicast. Note that the first embodiment assumes that the multicast reception setting message is transmitted by unicast.

(5) When the sending device sends a multicast packet, the L3SW #1 transmits the multicast packet in accordance with the multicast distribution tree of the corresponding multicast group. The multicast packet transmitted by the L3SW #1 is forwarded by each L2SW from the forward port for the corresponding multicast group and is not forwarded from the other ports. This can suppress flooding of the multicast packet to devices that do not ask for the packet.

Also, multicast packets are forwarded on the route in the reverse direction to the route of the Join message. That is, in the first embodiment, the root SW, which is aware of the entire topology of the TRILL multicast distribution tree, uses a multicast reception request message to determine the route of the Join message. Also, each L2SW is informed of the route in the reverse direction to the route of the Join message by the multicast reception setting message so that each L2SW forwards multicast packets on the route in the reverse direction to the Join message. The first embodiment thereby suppresses flooding of multicast packets.

Figure 6:
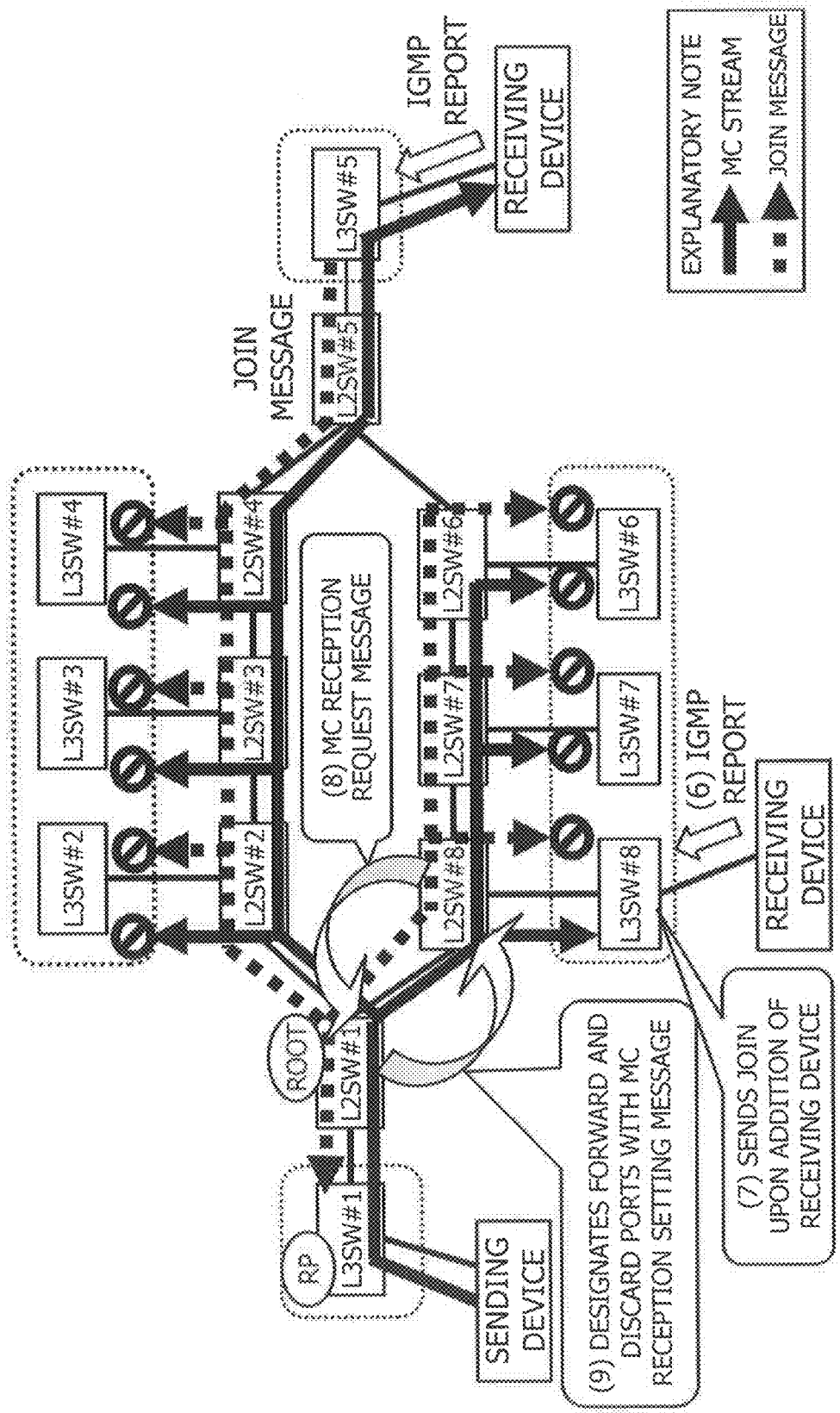
FIG. 6 is a diagram illustrating an exemplary flow of a process for a receiving device below the L3SW #8 to newly enter the multicast group.

FIG. 6 is a diagram illustrating an exemplary flow of a process for a receiving device below the L3SW #8 to newly enter the multicast group. (6) An IGMP report is transmitted by the receiving device below the L3SW #8 which is to newly enter the multicast group.

(7) Since the Join message and multicast packets for the multicast group in question are not delivered to the L3SW

8, the L3SW #8 is not in a state in which it can receive multicast packets for that multicast group. When receiving the IGMP report, the L3SW #8 thus registers the new receiving device as a destination to which multicast packets will be delivered and also sends a Join message for requesting forwarding of multicast packets to itself.

(8) After receiving the Join message sent from the L3SW #8, the L2SW #8 sends a multicast reception request message to the L2SW #1 as the root SW. The L2SW #8 subsequently forwards the Join message from the port on the side connected with the RP. The Join message is delivered to the L3SW #1 as the RP by way of L2SW #1.

(9) When the L2SW #1 receives the multicast reception request message from the L2SW #8, as the L2SW #1 is the root SW, it sends a multicast reception setting message designating the forward port and the discard port. In response to reception of this multicast reception setting message, the L2SW #8 starts to forward multicast packets to the L3SW #8.

Figure 7:
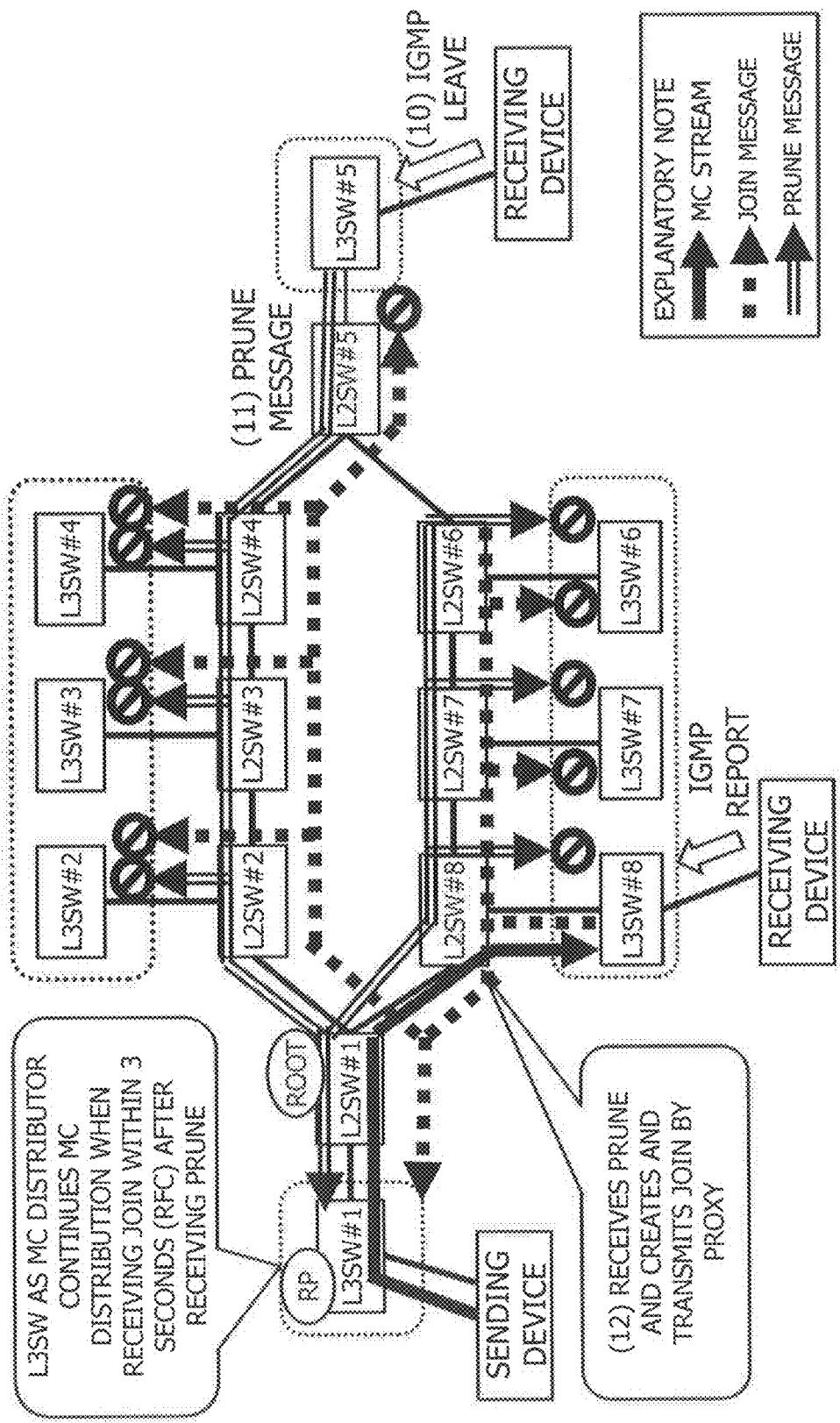
FIG. 7 is a diagram illustrating an exemplary flow of a process for the receiving device below the L3SW #5 to withdraw from the multicast group.

FIG. 7 is a diagram illustrating an exemplary flow of a process for the receiving device below the L3SW #5 to withdraw from the multicast group. (10) The receiving device below the L3SW #5 transmits an IGMP Leave, which is a request to withdraw from a multicast group.

(11) Upon receiving the IGMP Leave, the L3SW #5 transmits a Prune message. In the first embodiment, the Prune message is forwarded from the port on the side connected with the RP as with the Join message. Since L2SWs are connected by optical lines in the network illustrated in FIG. 7, the Prune message also reaches L2SWs #6 to #8.

After receiving the Prune message, the L3SW #1 as the RP stops distribution of multicast packets if it does not receive a Join message within three seconds. The L3SW #8, however, has a receiving device that wants to continue to receive multicast packets connected to it. The L3SW #8 thus preferably transmits a Join message in order to have the L3SW #1 as the RP continue to distribute multicast packets to it.

However, the Prune message reaches the L2SW #8 but is prevented by the L2SW #8 from being forwarded to the L3SW #8, which is connected with a port other than the one connected with the RP. The L3SW #8 thus is not able to find that a Prune message has been transmitted by another L3SW. That is, the L3SW #8 is not able to transmit a Join message in response to reception of a Prune message from another L3SW as illustrated in FIG. 3.

(12) In the first embodiment, when receiving a Prune message, the L2SW #8 creates and sends a Join message on behalf of the L3SW #8. This can make the L3SW #1 as the RP continue to distribute multicast packets.

Figure 8:
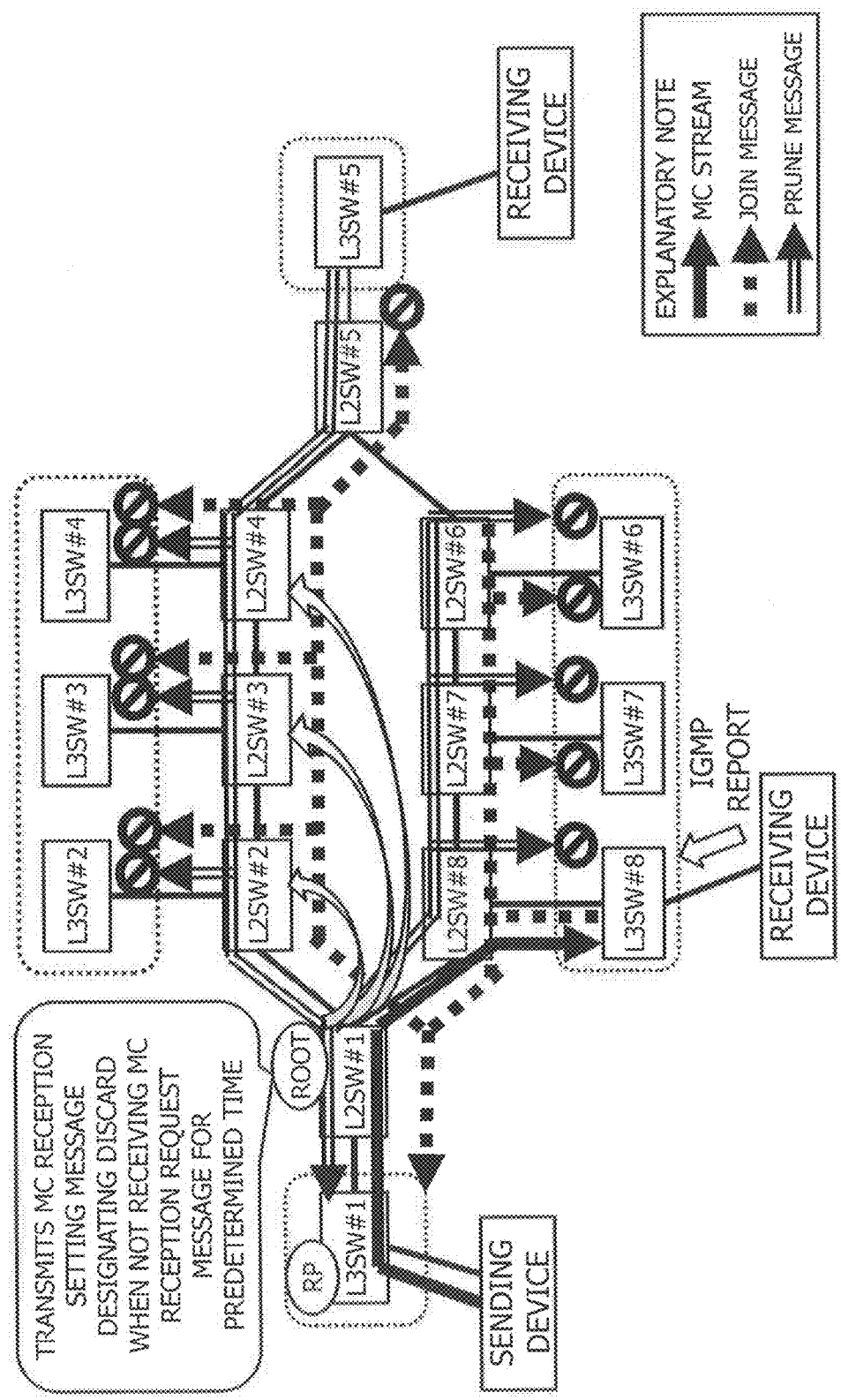
FIG. 8 is a diagram illustrating an example of a process among L2SWs in relation to the operation of a multicast network.

FIG. 8 is a diagram illustrating an example of a process in L2SWs in relation to the operation of a multicast network. The network illustrated in FIG. 8 is a network for which the process in FIG. 7 has been completed.

The L3SW #8 having a receiving device connected below it transmits a Join message at predetermined intervals (60 seconds for example) and the L2SW #8 accordingly transmits a multicast reception request message. That is, the L2SW #8 sends a multicast reception request message at the same intervals as the Join message.

The L2SW #1 as the root SW monitors reception of a multicast reception request message on a per-port basis, and if it does not receive a multicast reception request message for a predetermined period of time at a port, it transmits a multicast reception setting message which designates all ports as discard ports from that port. This multicast reception setting message is sent to the L2SW that is located downstream of the port at which a multicast reception request message has not been received for the predetermined period of time. The predetermined period of time is 210 seconds, for example. This stops forwarding of multicast packets to the L2SW #5 side.

As described above, in the first embodiment, L2SWs uses a port at which a Join message has been received as the forward port for the corresponding multicast group and does not forward multicast packets for that multicast group from ports other than the forward port. Also, Join and Prune messages are not forwarded from ports other than the port of an L2SW on the side connected with the RP. This can suppress flooding of multicast packets by L2SWs.

<Configuration of L2SW>

Figure 9:
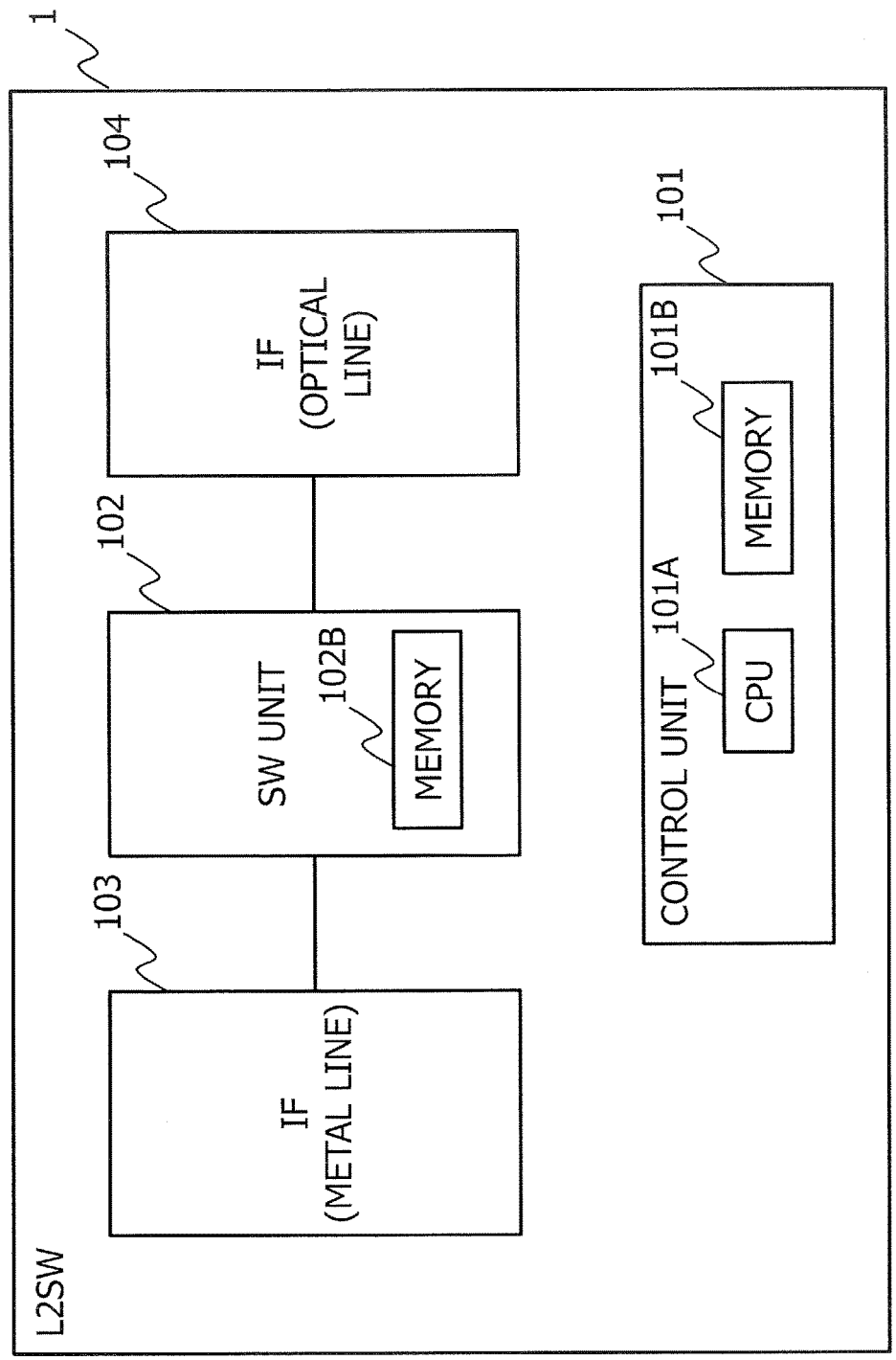
FIG. 9 is a diagram illustrating an example of the hardware configuration of an L2SW.

FIG. 9 is a diagram illustrating an example of the hardware configuration of an L2SW 1. The L2SW 1 includes multiple interface (IF) unit 103 and IF unit 104, a SW unit 102 that relays packets between the IF unit 103 and the IF unit 104, and a control unit 101 which represents a control plane of the L2SW 1.

The IF unit 103 is an interface for connection of a metal line, for example. The IF unit 103 performs baseband processing on an electrical signal input from a metal line, converts it to a predetermined data format, and outputs it to the SW unit 102. The IF unit 103 performs the reverse processing on data input from the SW unit 102; it converts the data into an electrical signal and outputs it to the metal line.

The IF unit 104 is an interface for connection of an optical line, for example. The IF unit 104 converts an optical signal input from an optical line into an electrical signal, converts the electrical signal into a predetermined data format, and outputs it to the SW unit 102. The IF unit 104 performs the reverse processing on data input from the SW unit 102; it converts the data into an electrical signal, then into an optical signal, and outputs it to the optical line. Although FIG. 9 depicts one IF unit 103 and one IF unit 104, multiple units of them may be provided.

The SW unit 102 is a circuit such as a FPGA (field-programmable gate array) that relays packets between the IF unit 103 and the IF unit 104. The SW unit 102 also includes memory 102B. The memory 102B may be RAM (Random Access Memory), for example. The memory 102B has stored therein an access list for example, and the SW unit 102 forwards packets that match the access list to the control unit 101. The access list stores IP addresses or MAC addresses used with the Join message, Prune message, multicast reception request message, multicast reception setting message, and the like, for example.

The control unit 101 includes a CPU (Central Processing Unit) 101A and memory 101B. The memory 101B includes RAM and ROM (Read Only Memory). The memory 101B has stored therein an OS (Operating System), a multicast forward program and so forth, for example. The CPU 101A executes the multicast forward program to carry out the processes described in FIGS. 4 to 8, for example.

Note that the L2SW hardware configuration illustrated in FIG. 9 is an example and permits modifications as appropriate. For instance, an L2SW may omit either one of the IF unit 103 for metal line connection or the IF unit 104 for optical line connection.

Figure 10:
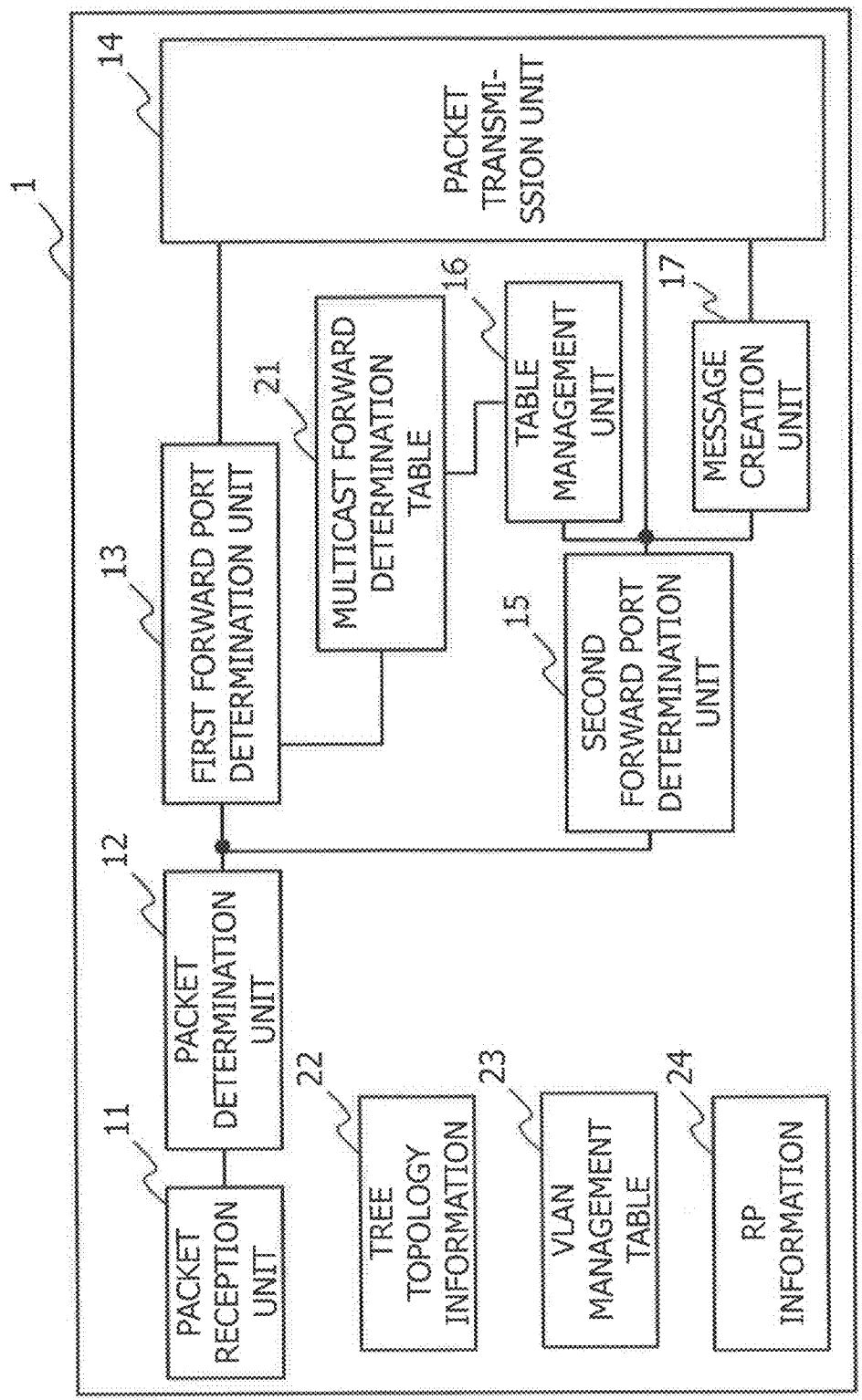
FIG. 10 is a diagram illustrating an example of the functional configuration of the L2SW.

FIG. 10 is a diagram illustrating an example of the functional configuration of the L2SW 1. The L2SW 1 includes a packet reception unit 11, a packet determination unit 12, a first forward port determination unit 13, a packet transmission unit 14, a second forward port determination unit 15, a table management unit 16, a message creation unit 17, a multicast forward determination table 21, a tree topology information 22, a VLAN management table 23, and RP information 24.

The packet reception unit 11, packet determination unit 12, first forward port determination unit 13, packet transmission unit 14, multicast forward determination table 21, and VLAN management table 23 are functional components corresponding to the SW unit 102. The packet reception unit 11 and the packet transmission unit 14 are interfaces with the IF units 103 and 104.

The packet determination unit 12 distributes packets to the first forward port determination unit 13 and the second forward port determination unit 15. For example, the packet determination unit 12 uses the access list stored in the memory 102B of the SW unit 102 to forward a packet having a destination IP or MAC address that matches the access list to the second forward port determination unit 15. In the access list, the multicast IP address used for Join and Prune messages, and the IP or MAC address of the L2SW 1 itself are registered, for example. A packet that does not match the access list is forwarded to the first forward port determination unit 13.

Hereinbelow, the first embodiment assumes that the Join message, Prune message, multicast reception request message, and multicast reception setting message are output to the second forward port determination unit 15. Also, multicast packets for a predetermined multicast group are output to the first forward port determination unit 13. In the first embodiment, a multicast reception request message and a multicast reception setting message to another L2SW 1 are output to the first forward port determination unit 13 as unicast packets.

The first forward port determination unit 13 determines the forward port for the packet input from the packet determination unit 12 and outputs the packet to the packet transmission unit 14. For example, the first forward port determination unit 13 determines the forward port for a unicast packet in accordance with a unicast routing table (not illustrated). For example, the first forward port determination unit 13 determines the forward port for a multicast packet in accordance with the multicast forward determination table 21 described below. The first forward port determination unit 13 is an example of a "forwarding unit".

The multicast forward determination table 21 and the VLAN management table 23 are stored in the memory 102B of the SW unit 102. The multicast forward determination table 21 is a table storing forward ports of the multicast group. The details of multicast forward determination table 21 will be discussed later. The VLAN management table 23 is a table storing information on VLANs present in the L2SW 1 and ports belonging to each of the VLANs, for example.

The second forward port determination unit 15, table management unit 16, and message creation unit 17 are functional components implemented by the CPU 101A of the control unit 101 executing the multicast forward program stored in the memory 101B. The tree topology information 22 and the RP information 24 are stored in the memory 101B of the control unit 101.

The tree topology information 22 is information about a TRILL multicast distribution tree. For example, the tree topology information includes the MAC address of the root SW of the TRILL multicast distribution tree. The tree topology information 22 is obtained through exchange of TRILL messages with other L2SWs 1.

When the L2SW 1 is the root SW, relationship of connections among all the L2SWs 1 present in the TRILL multicast distribution tree is stored in the tree topology information 22. More specifically, the IP addresses and MAC addresses, port numbers, information on the device connected to each port and the like of all the L2SWs 1 are stored in the tree topology information 22 of the root SW. The tree topology information is an example of information stored in a "third storage unit".

The RP information 24 is information about the IP address of the L3SW which is the RP of each multicast group and the port on the side connected with the L3SW as the RP. The IP address of the RP is obtained from a Join message, for example. Also, the port on the side connected with the RP is obtained as the port that receives a PIM Hello message whose source IP address is the IP address of the L3SW as the RP, for example. The PIM Hello message is a message transmitted by all L3SWs in which PIM is implemented at predetermined intervals (30 seconds, for example). Hereinafter, the port on the side connected with the RP will be referred to as RP connection port. The RP information 24 is an example of information stored in a "second storage unit".

To the second forward port determination unit 15, a Join message, a Prune message, and packets destined for the IP address or MAC address of the L2SW 1 itself are input from the packet determination unit 12. In the first embodiment, the multicast reception request message and multicast reception setting message are transmitted by unicast. Accordingly, in the first embodiment, a packet destined for the IP address or MAC address of the L2SW 1 itself is a multicast reception request message or a multicast reception setting message.

When a Join or Prune message is input, the second forward port determination unit 15 decides that the RP connection port is to be the forward port for the Join/Prune message and outputs the message to the packet transmission unit 14. When a Join message is being input from the L3SW, the second forward port determination unit 15 instructs the message creation unit 17 to create a multicast reception request message. Whether a Join message is being input from the L3SW or not can be determined by deciding whether the port receiving the Join message is the port for connection of the L3SW or not.

When a Prune message is input, the second forward port determination unit 15 decides whether a predetermined condition is met or not, and instructs the message creation unit 17 to create a Join message by proxy if the predetermined condition is met. The predetermined condition may be that there is a port registered as the forward port for the corresponding multicast address in the multicast forward determination table 21 in addition to the port at which the Prune message is received, for example.

When a multicast reception request message destined for the L2SW 1 itself is input, the second forward port determination unit 15 instructs the message creation unit 17 to create a multicast reception setting message. When a multicast reception setting message destined for the L2SW 1 itself is input, the second forward port determination unit 15 instructs the table management unit 16 to update the multicast forward determination table 21 based on the multicast reception setting message. The second forward port determination unit 15 is an example of a "determination unit".

The table management unit 16 updates the multicast forward determination table 21 in response to the instruction from the second forward port determination unit 15. The table management unit 16 also monitors reception of a multicast reception request message at each forward port. If there is any forward port that has not received a multicast reception request message for a predetermined period of time, the table management unit 16 instructs the message creation unit 17 to create a multicast reception setting message that designates all the ports as discard ports. The predetermined period of time is 210 seconds, for example. The table management unit 16 is an example of a "management unit".

The message creation unit 17 creates a multicast reception request message, a multicast reception setting message, or a Join message in accordance with instructions from the second forward port determination unit 15 or the table management unit 16, and outputs it to the packet transmission unit 14. The message creation unit 17 is an example of a "notification unit".

When creating a multicast reception setting message, the message creation unit 17 determines the route of the Join message for the corresponding multicast group on the basis of the multicast reception request message and the tree topology information 22. The message creation unit 17 creates a multicast reception setting message for each L2SW 1 specifying the ports on the route as forward ports and the ports not on the route as discard ports. In creation of a multicast reception setting message, as the L2SW 1 is the root SW, information on all of the L2SWs 1 present in the TRILL multicast distribution tree is stored in the tree topology information 22.

FIG. 11 is an example of the multicast forward determination table 21. The multicast forward determination table 21 stores correspondences of a multicast address, a forward port, and an aging timer as its entries. The forward port in the multicast forward determination table 21 is a port that is designated as the forward port for the corresponding multicast address by a multicast reception setting message.

An entry of the multicast forward determination table 21 is created for each combination of a multicast address and a forward port. In FIG. 11, accordingly, two entries, an entry with "port 1" being the forward port and an entry with "port 5" being the forward port, are present for multicast address "231.0.0.10".

An entry of the multicast forward determination table 21 is registered in response to reception of a multicast reception setting message in accordance with the contents of the multicast reception setting message. When a forward port in the multicast forward determination table 21 is designated as discard port by a multicast reception setting message, "discard" is set in the "forward port" in the corresponding entry.

The aging timer in the multicast forward determination table 21 is set to the initial value by the table management unit 16 every time a multicast reception request message is received at the forward port of the corresponding entry. The aging timer is a countdown timer. If the L2SW 1 is the root SW, when the aging timer reaches 0, a multicast reception setting message that designates all the ports as discard ports is transmitted from the forward port of the corresponding entry to the multicast group of that entry. The initial value of the aging timer is 210 seconds, for example. The multicast forward determination table 21 is an example of a "first storage unit".

<Message Structure>

FIG. 12 is a diagram illustrating an example of information contained in a multicast reception request message. For the multicast reception request message, a BPDU may be employed or a specially defined packet may be employed, for example. The multicast reception request message contains a reception requesting node, a multicast address, a receiving port number, and a VLAN, for example.

The "reception requesting node" in the multicast reception request message is the address of the L2SW 1 that received a Join message. As the first embodiment assumes that an L2SW that has received a Join message from the L3SW creates and transmits a multicast reception request message, the IP address or MAC address of the L2SW 1 itself that creates the multicast reception request message is stored in the "reception requesting node".

The "multicast address" in the multicast reception request message is the multicast address of the multicast group for which the L2SW 1 that creates the multicast reception request message requests forwarding of multicast packets. In the "multicast address" in the multicast reception request message, the multicast address of the multicast group included in the Join message that triggered the creation of the multicast reception request message is stored.

In the "receiving port number" in the multicast reception request message, the port number of the port at which the Join message is received is stored. In the "VLAN" in the multicast reception request message, information on the VLAN that requests forwarding of multicast packets for the corresponding multicast group is stored. In the "VLAN", the VLAN ID that is set in the receiving port of the Join message is stored, for example.

FIG. 13 is a diagram illustrating an example of information contained in a multicast reception setting message. For multicast reception setting message, a BPDU may be employed or a specially defined packet may be employed, for example. The multicast reception setting message includes a multicast address, a VLAN, a forward port number, and a discard port number, for example.

In the "multicast address" and "VLAN" in the multicast reception setting message, the values of the "multicast address" and "VLAN" included in the multicast reception request message in response to which the multicast reception setting message is created are stored.

In the "forward port number" and "discard port number" in the multicast reception setting message, the forward port number and discard port number(s) for multicast packets for the corresponding multicast group are stored respectively. The forward port and discard port(s) are determined by the message creation unit 17.

The multicast reception setting message is created when the L2SW 1 is the root SW. When the L2SW 1 is the root SW, the topology of the entire TRILL multicast distribution tree is stored in the tree topology information 22. The L2SW 1 as the root SW accordingly can determine the route of the Join message in the TRILL multicast distribution tree using the tree topology information 22 if the L2SW that received the Join message from the L3SW is identified. Since multicast packets typically flow in one direction from the sending device side to the receiving device side, the port on the downstream side (the receiving device side) on the identified route is determined to be the forward port. The port on the downstream side (the receiving device side) that is not on the identified route is determined to be the discard port.

Although the first embodiment assumes that the multicast reception setting message is transmitted by unicast, this is not a limitation. The multicast reception setting message may also be transmitted by multicast. When a multicast reception setting message is transmitted by multicast, identification information of the target L2SWs 1 may be included in the multicast reception setting message in addition to the information illustrated in FIG. 13. Additionally, when the multicast reception setting message is transmitted by multicast, information on all of the L2SWs 1 present in the TRILL multicast distribution tree may be included.

<Specific Example>

Figure 14:
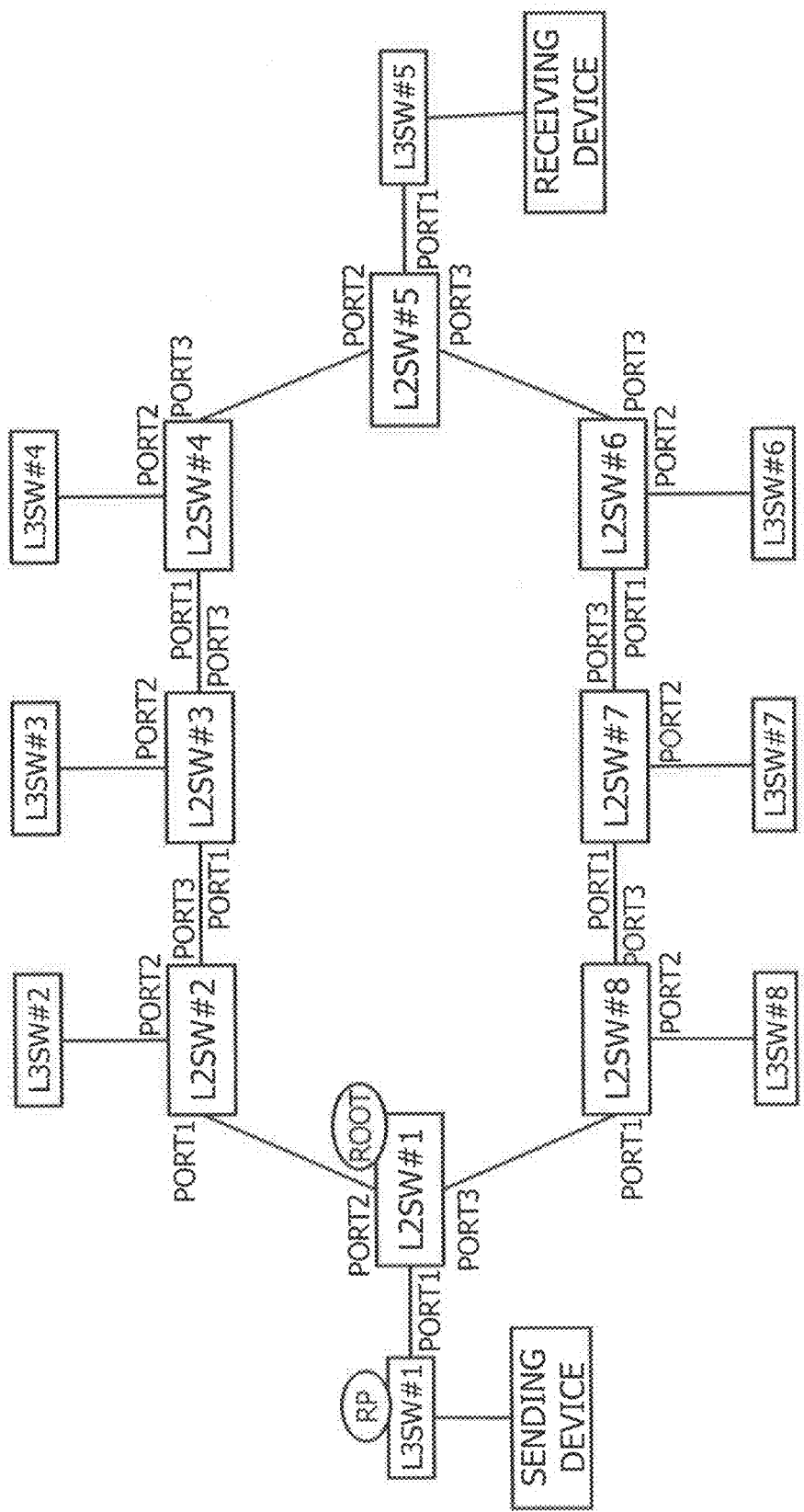
FIG. 14 is a diagram illustrating the network structure and the relationship of physical connections among L2SWs in the network contemplated for a specific example.

FIG. 14 is a diagram illustrating the network structure and the relationship of physical connections among L2SWs in the network contemplated for a specific example. The root SW of the TRILL multicast distribution tree is L2SW #1. The RP of the multicast group in question is the L3SW connected with the L2SW #1. The sending device is located on the port1 side of the L2SW #1. The receiving device is located on the port1 side of the L2SW #5.

Figure 15A:
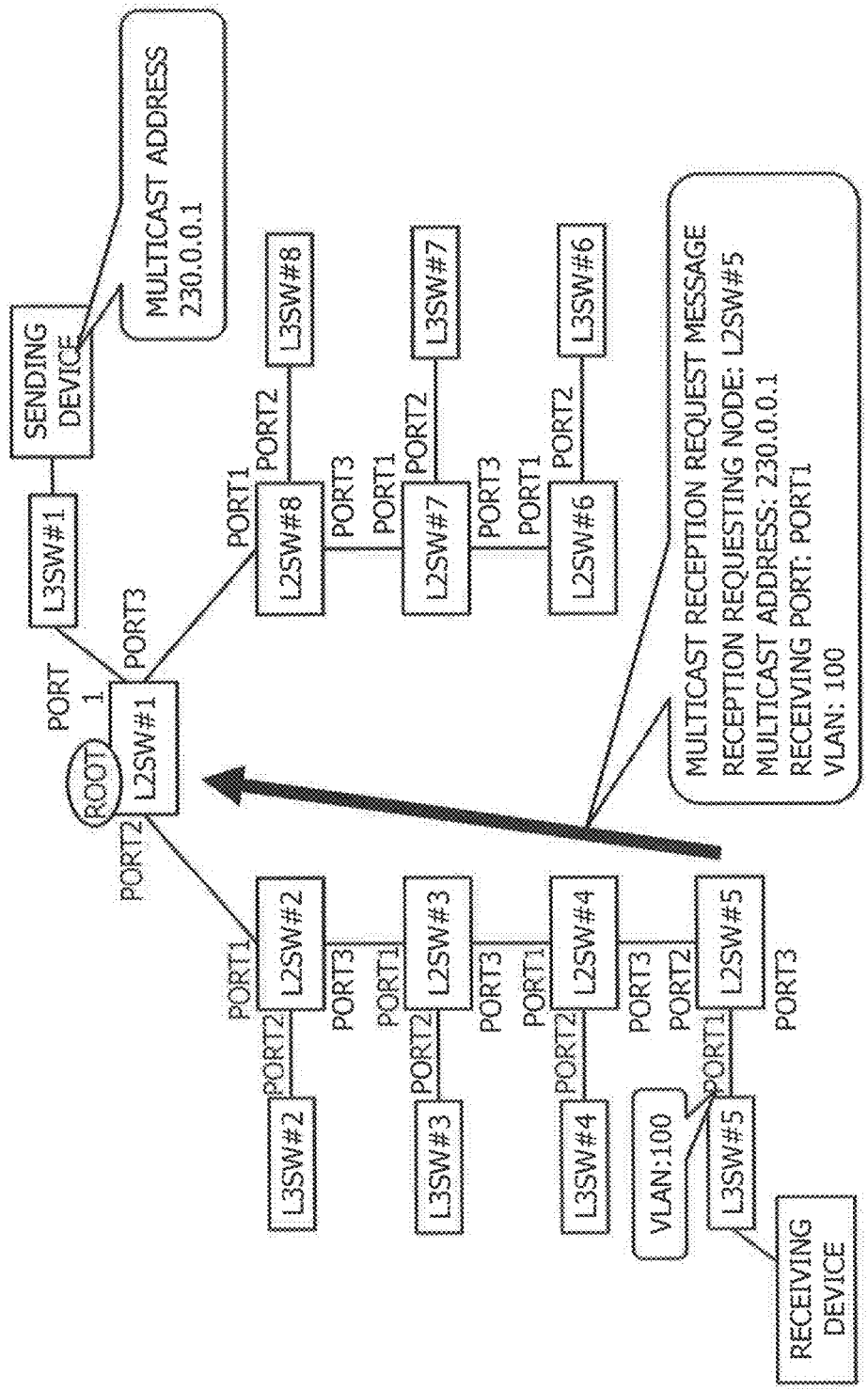
FIG. 15A is a diagram illustrating an example of the multicast reception request message for a case in which an entry request for the multicast group (an IGMP report) is transmitted by the receiving device in the network illustrated in FIG. 14.

FIG. 15A is a diagram illustrating an example of the multicast reception request message for a case in which an entry request for the multicast group (an IGMP report) is sent by the receiving device in the network illustrated in FIG. 14. FIG. 15A represents the relationship of logical connections among the L2SWs in the TRILL multicast distribution tree in the network illustrated in FIG. 14.

In FIG. 15A, the port1 of the L2SW #5, on which the receiving device is located, is assumed to belong to a VLAN 100. It is also supposed that the sending device uses a multicast IP address 230.0.0.1 and that there is yet no receiving device that is a member of the multicast group using the multicast IP address 230.0.0.1 in the network illustrated in FIG. 15A.

When an IGMP report for the multicast group that uses the multicast IP address 230.0.0.1 is transmitted by the receiving device, the L2SW #5 receives a Join message from the L3SW at port1. In response to reception of the Join message, the L2SW #5 creates a multicast reception request message and sends it to the root SW.

The multicast reception request message created has the following contents:
 reception requesting node: L2SW #5
 multicast address: 230.0.0.1
 receiving port: port1
 VLAN: 100.

Figure 15B:
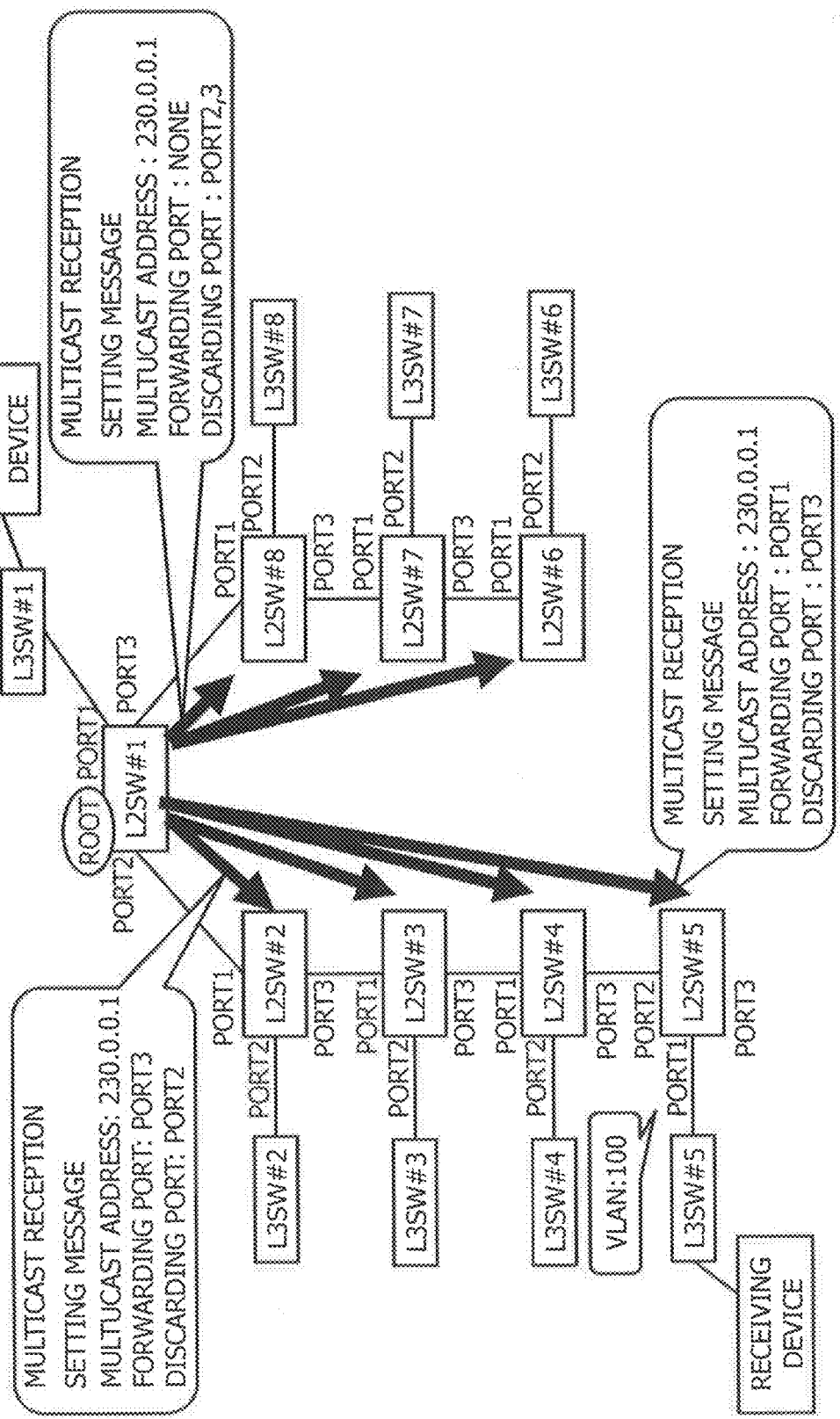
FIG. 15B is a diagram illustrating an example of the multicast reception setting message for the multicast reception request message illustrated in FIG. 15A.

FIG. 15B is a diagram illustrating an example of the multicast reception setting message for the multicast reception request message illustrated in FIG. 15A. The network illustrated in FIG. 15B is the same as FIG. 15A.

Upon receiving the multicast reception request message, the L2SW #1 as the root SW determines the route of the Join message. L2SW #1 as the root SW has received the multicast reception request message illustrated in FIG. 15A and finds that the receiving port of the Join message is the port1 of the L2SW #5. From the receiving port of the Join message, the multicast address, and the topology of the entire multicast distribution tree in the tree topology information 22, the L2SW #1 as the root SW obtains the route of the Join message.

In the example illustrated in FIG. 15B, the Join message is routed from the port1 of L2SW #5→port3 of L2SW #4→port3 of L2SW #3→port3 of L2SW #2→port2 of L2SW #1→to the L3SW which is the RP. Note that the route is presented in the order of the receiving port of the Join message at each L2SW. The L2SW #1 as the root SW designates the ports on this route as forward ports and the ports not on the route as discard ports. The L2SW #1 as the root SW accordingly creates multicast reception setting messages as follows.

To the L2SWs #2 to #4, a multicast reception setting message having the following contents is transmitted:
 multicast address: 230.0.0.1
 VLAN: 100
 forward port number: port3
 discard port: port2.

To the L2SW #5, a multicast reception setting message having the following contents is transmitted:
 multicast address: 230.0.0.1
 VLAN: 100
 forward port number: port1
 discard port: port3.

To the L2SWs #6 to #8, a multicast reception setting message having the following contents is transmitted:
 multicast address: 230.0.0.1
 VLAN: 100
 forward port number: none
 discard port: port2 and port3.

Upon receiving this multicast reception setting message at the L2SWs #6 to #8, an entry with the multicast address "230.0.0.1" and the forward port "discard" is created in the multicast forward determination table 21.

Note that, although not illustrated in FIG. 15B, the L2SW #1 as the root SW transmits a multicast reception setting message also to itself using, for example, a loopback address. The reception setting message sent to the L2SW #1 as the root SW has the following contents:
 multicast address: 230.0.0.1
 VLAN: 100
 forward port number: port2
 discard port: port3.

In a case in which L2SWs are connected by metal lines, there is no possibility of a packet sent out from an L2SW to an optical line reaching other L2SWs as in the case of optical line connection. Also, for the multicast reception setting message described above, the port3 of the L2SW #1 is a discard port so that multicast packets with multicast address 230.0.0.1 are not transferred from the port3 of the L2SW #1. The L2SW #1 therefore does not have to transmit a multicast reception setting message to L2SWs #6 to #8, which are not on the route of the Join message.

<Process Flow>

FIGS. 16A, 16B, 16C, and 16D are exemplary flowcharts of processes in the control unit 101 when a packet is input to the control unit 101. The processes illustrated in FIG. 16A through FIG. 16D are started when a packet is input to the control unit 101. In the first embodiment, Join messages, Prune messages, multicast reception request messages destined for the L2SW 1 itself, and multicast reception setting messages destined for the L2SW 1 itself are input to the control unit 101 by the SW unit 102.

The processes in FIG. 16A to FIG. 16D are carried out by the CPU 101A of the control unit 101 executing the multicast forward program stored in the memory 101B. Although the agent of the processes illustrated in FIG. 16A to FIG. 16D is the CPU 101A of the control unit 101, the processes will be described below by taking the second forward port determination unit 15, table management unit 16, and message creation unit 17, which are functional components of the control unit 101, as the agents.

In OP1, the second forward port determination unit 15 determines whether a packet input from the packet determination unit 12 is a Join message or not. This determination is made based on the destination IP address (224.0.0.13), whether the value of the type field is "3", indicative of a Join and a Prune message, and whether an address is stored in the field which stores the address of the device requesting entry (Encoded-Joined Source Address field), for example.

If the input packet is a Join message (OP1: YES), the process continues to OP11 in FIG. 16B. If the input packet is not a Join message (OP1: NO), the process continues to OP2.

In OP2, the second forward port determination unit 15 determines whether the packet input from the packet determination unit 12 is a Prune message or not. This determination is made based on the destination IP address (224.0.0.13), whether the value of the type field is "3", indicative of a Join and a Prune message, and whether an address is stored in the field which stores the address of the device requesting withdrawal (Encoded-Pruned Source Address field), for example.

If the input packet is a Prune message (OP2: YES), the process continues to OP21 in FIG. 16C. If the input packet is not a Prune message (OP2: NO), the process continues to OP3.

In OP3, the second forward port determination unit 15 determines whether the input packet is a multicast reception request message destined for the L2SW 1 itself or not. Since the multicast reception request message is transmitted by unicast to the root SW in the first embodiment, a multicast reception request message is determined to be a packet for the L2SW 1 itself if the destination IP address of the message is that of the L2SW 1. Also, whether the packet is a multicast reception request message or not can be determined from whether the format and the like of the packet conform to those of the multicast reception request message or not.

If the input packet is a multicast reception request message destined for the L2SW 1 itself (OP3: YES), the process continues to OP31 in FIG. 16D. If the input packet is not a multicast reception request message (OP3: NO), the process continues to OP4.

In OP4, the second forward port determination unit 15 determines whether the input packet is a multicast reception setting message destined for the L2SW 1 itself or not. Since a multicast reception setting message is transmitted by unicast to each L2SW in the first embodiment, a multicast reception setting message is determined to be a packet for the L2SW 1 itself if the destination IP address of the message is that of the L2SW 1. Also, whether a packet is a multicast reception setting message or not can be determined from whether the format and the like of the packet conform to those of the multicast reception setting message or not.

If the input packet is a multicast reception setting message destined for the L2SW 1 itself (OP4: YES), the process continues to OP5. If the input packet is not a multicast reception setting message (OP4: NO), the process illustrated in FIG. 16A ends.

In OP5, the table management unit 16 updates the multicast forward determination table 21 based on the input multicast reception setting message. After this, the process illustrated in FIG. 16A ends.

Figure 16A:
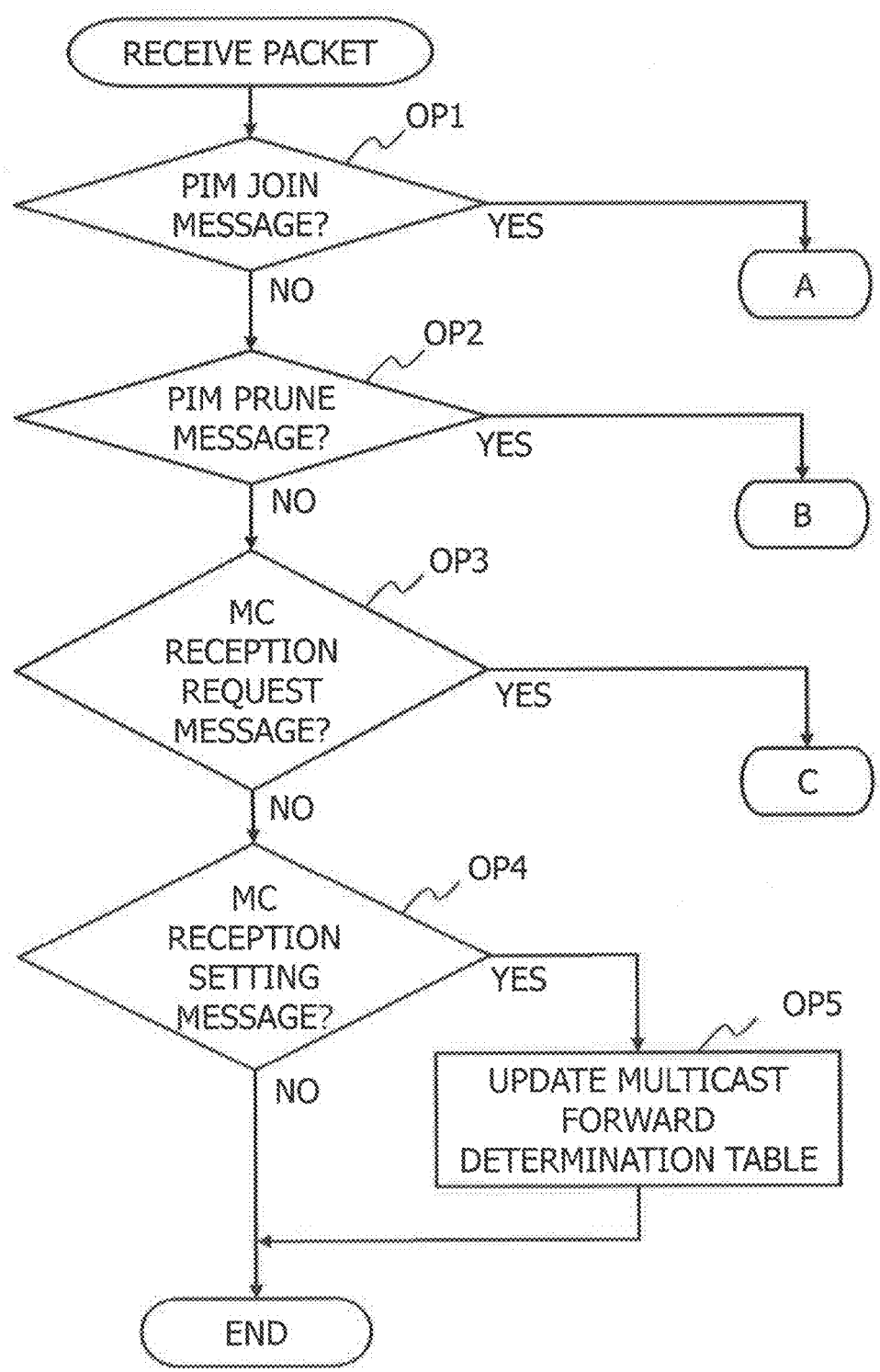
FIG. 16A is an exemplary flowchart of a process in the control unit when a packet is input to the control unit.
Figure 16B:
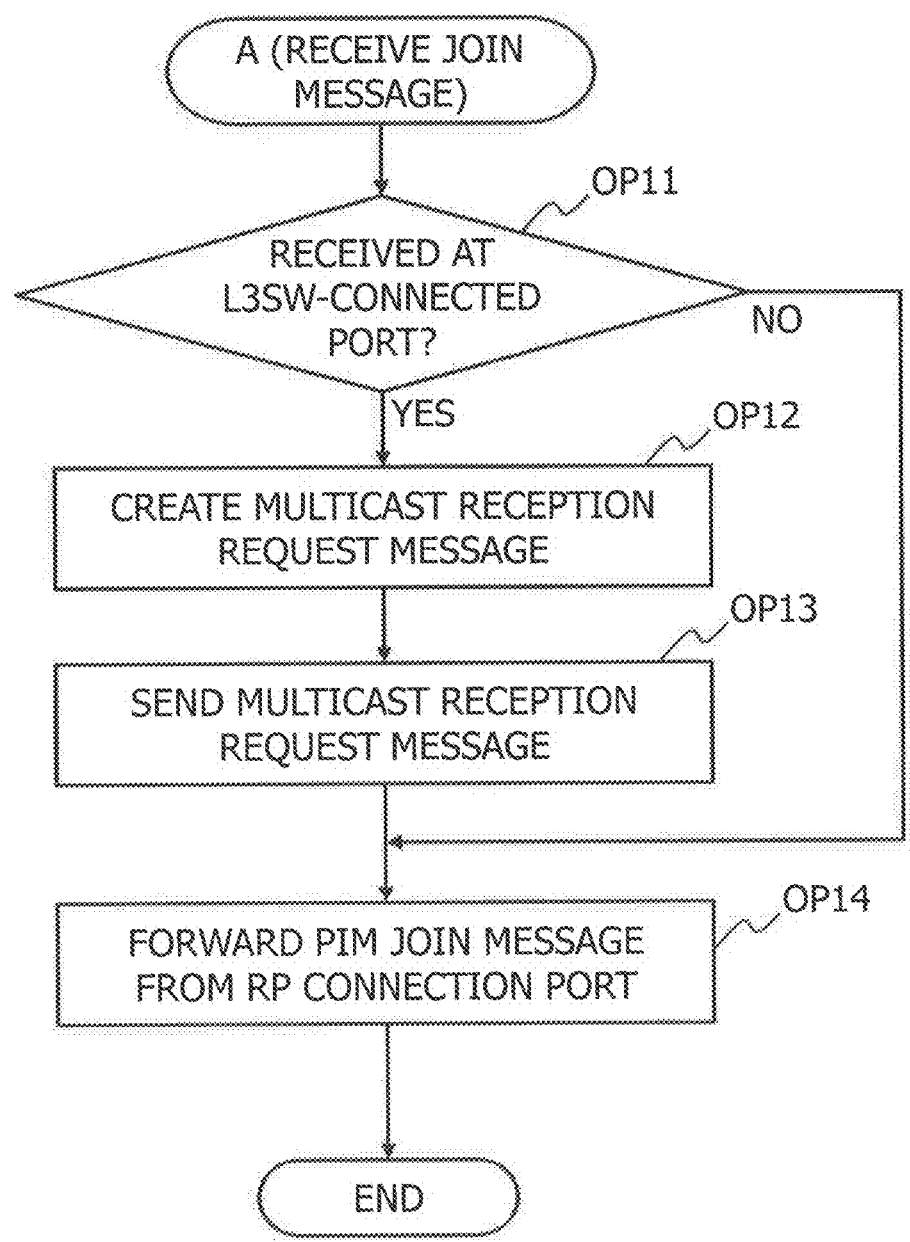
FIG. 16B is an exemplary flowchart of a process for a case where a Join message is input to the control unit.

FIG. 16B is an exemplary flowchart of a process for a case where a Join message is input to the control unit 101. In OP11, the second forward port determination unit 15 determines whether the Join message is received at the port connected with the L3SW or not. If the Join message is received at the port connected with the L3SW (OP11: YES), the process continues to OP12. If the Join message is received at a port other than the port connected with the L3SW (OP11: NO), the process continues to OP14.

In OP12, the second forward port determination unit 15 instructs the message creation unit 17 to create a multicast reception request message and the message creation unit 17 creates a multicast reception request message. The process then continues to OP13.

In OP13, the message creation unit 17 outputs the multicast reception request message created to the SW unit 102. Since a multicast reception request message is transmitted to the root SW by unicast, the forward port is determined and the multicast reception request message is transmitted by the SW unit 102. The process then continues to OP14.

In OP14, the second forward port determination unit 15 decides that the RP connection port is to be the forward port for the Join message and outputs the Join message to the SW unit 102. The Join message is forwarded from the RP connection port. The process illustrated in FIG. 16B then ends.

Note that the first embodiment assumes that an L2SW that has received a Join message from the L3SW creates and transmits a multicast reception request message. If each L2SW that relays the Join message also creates and transmits a multicast reception request message, the determination in OP11 is not performed.

Figure 16C:
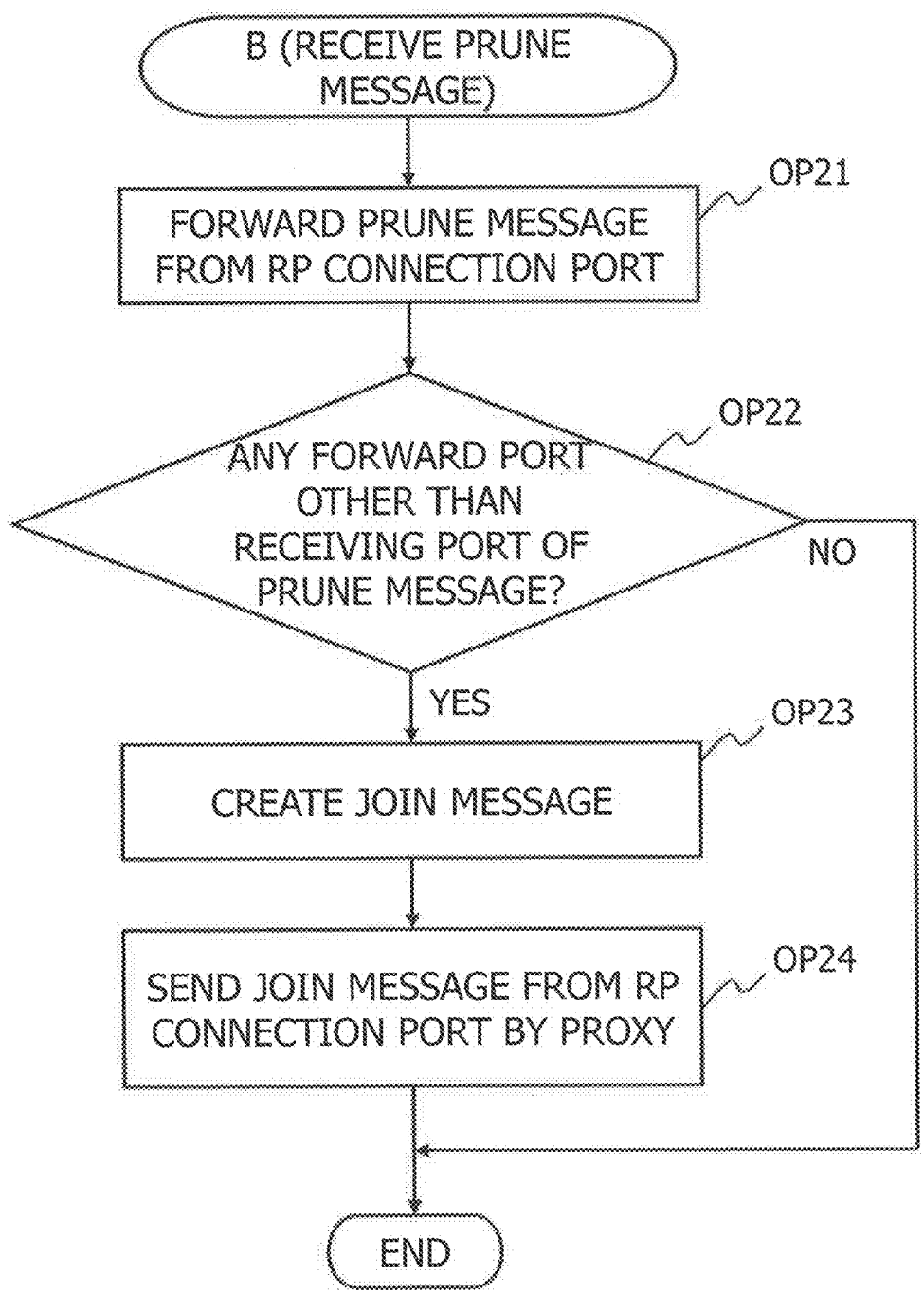
FIG. 16C is an exemplary flowchart of a process for a case where a Prune message is input to the control unit.

FIG. 16C is an exemplary flowchart of a process for a case where a Prune message is input to the control unit 101. In OP21, the second forward port determination unit 15 decides that the RP connection port is to be the forward port for Prune message and outputs the Prune message to the SW unit 102. The Prune message is forwarded from the RP connection port. The process then continues to OP22.

In OP22, the second forward port determination unit 15 determines whether or not there is any forward port for the corresponding multicast group in the multicast forward determination table 21 other than the receiving port of the Prune message. If there is a forward port for the multicast group in the multicast forward determination table 21 other than the receiving port of the Prune message (OP22: YES), the process continues to OP23. If there is no forward port for the multicast group in the multicast forward determination table 21 other than the receiving port of the Prune message (OP22: NO), the process illustrated in FIG. 16C then ends.

In OP23, the second forward port determination unit 15 instructs the message creation unit 17 to create a Join message. The message creation unit 17 creates a Join message for the multicast group indicated by the Prune message. The Join message is created with the same contents as the Join message that is received at a forward port other than the receiving port of the Prune message in the multicast forward determination table 21, for example. The process then continues to OP24.

In OP24, the message creation unit 17 decides that the RP connection port is to be the forward port for the Join message created and outputs the Join message to the SW unit 102. The Join message created is forwarded from the RP connection port. The process illustrated in FIG. 16C then ends.

Figure 16D:
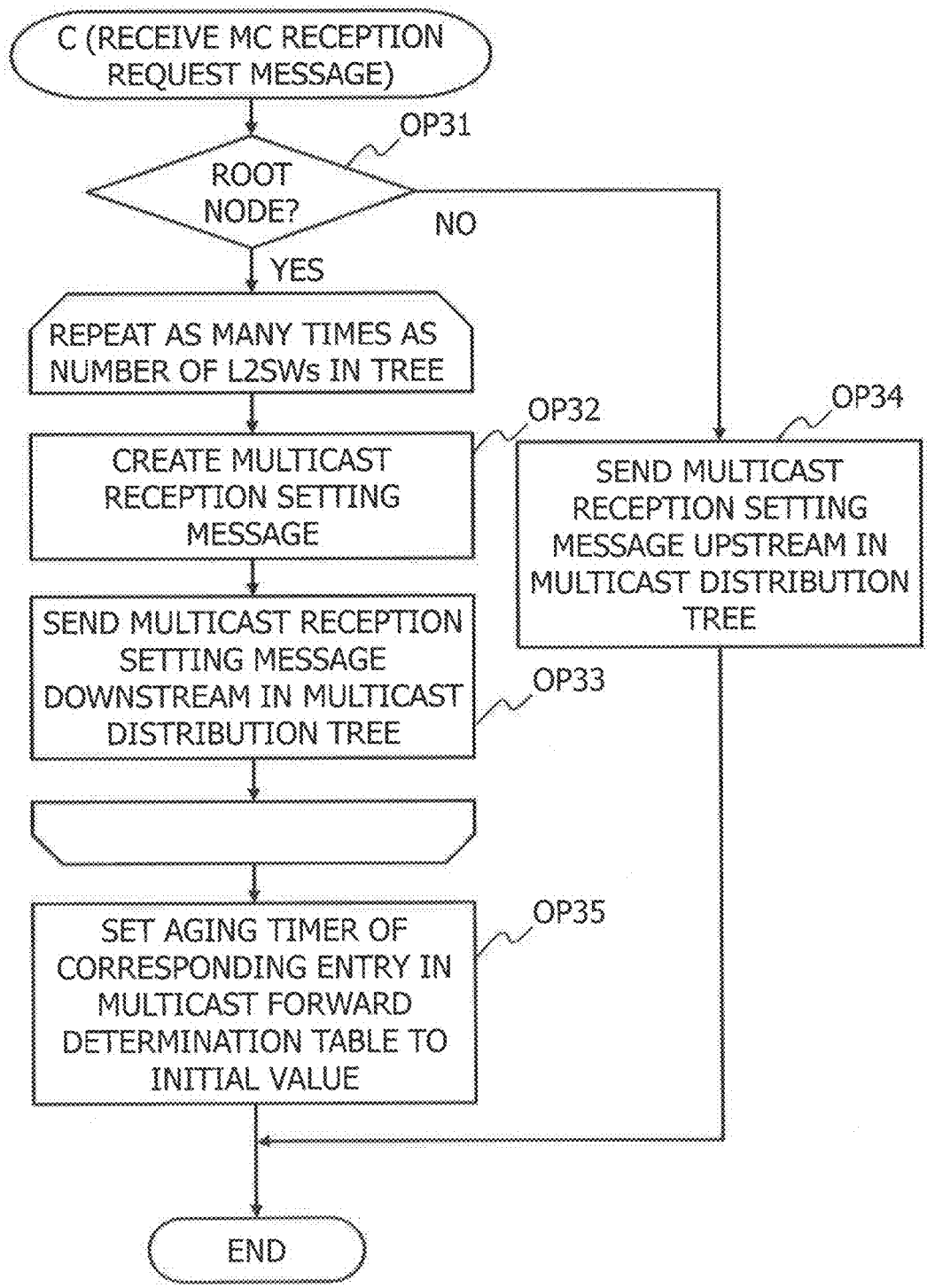
FIG. 16D is an exemplary flowchart of a process for a case where a multicast reception request message destined for the receiving L2SW itself is input to the control unit.

FIG. 16D is an exemplary flowchart of a process for a case where a multicast reception request message destined for the L2SW 1 itself is input to the control unit 101. In OP31, the second forward port determination unit 15 determines whether the L2SW 1 itself is the root SW or not.

If the L2SW 1 is not the root SW (OP31: NO), the second forward port determination unit 15 discards the multicast reception request message destined for the L2SW 1 itself in the first embodiment and the process illustrated in FIG. 16D ends. This is because a multicast reception request message is transmitted by unicast to the root SW in the first embodiment, so the multicast reception request message is processed and forwarded by the first forward port determination unit 13 without being input to the control unit 101.

In a case in which the multicast reception request message is transmitted by multicast, the multicast reception request message is input to the control unit 101 and the process continues to OP 34 if this node is not the root SW. In OP34, the second forward port determination unit 15 outputs the multicast reception request message to the SW unit 102, and the multicast reception request message is forwarded by the SW unit 102 from the port on the upstream side in the TRILL multicast distribution tree. The process illustrated in FIG. 16D then ends.

If the L2SW 1 is the root SW (OP31: YES), the process continues to OP32. In OP32, the second forward port determination unit 15 instructs the message creation unit 17 to create a multicast reception setting message. The message creation unit 17 determines the route of the Join message from the multicast reception request message and the tree topology information 22, determines the forward port and discard port of each L2SW 1, and creates a multicast reception setting message to each L2SW 1. The process then continues to OP33.

In OP33, the message creation unit 17 outputs the multicast reception setting message created to the SW unit 102. The multicast reception setting message is forwarded by the SW unit 102 from the port on the downstream side in the TRILL multicast distribution tree.

The creation of the multicast reception setting message in OP32 and transmission of the multicast reception setting message in OP33 are performed as many times as the number of L2SWs 1 in the TRILL multicast distribution tree including the L2SW 1 as the root SW. The process then continues to OP35.

In OP35, the table management unit 16 sets the aging timer in the multicast forward determination table 21 corresponding to the receiving port of the input multicast reception request message and the multicast group concerned to the initial value. The process illustrated in FIG. 16D then ends.

Note that part of the processes illustrated in FIG. 16A through FIG. 16D may be performed in a different order. For example, the decision processes in OP1 to OP4 in FIG. 16A may be performed in any order. For example, the Join message forwarding process in OP14 in FIG. 16B may be carried out before the process in OP11.

Figure 17:
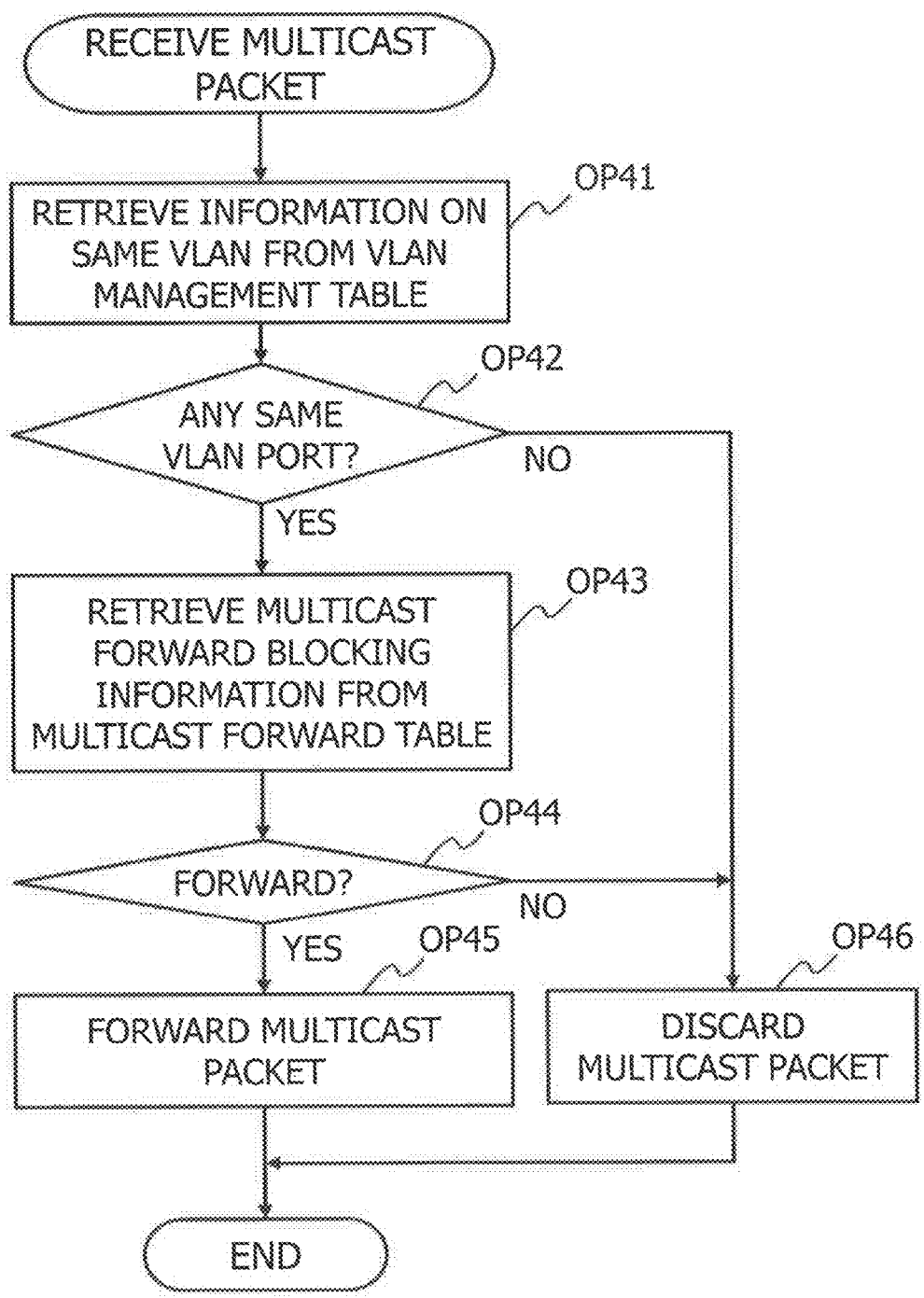
FIG. 17 is an exemplary flowchart of a process in the SW unit upon receiving a multicast packet.

FIG. 17 is an exemplary flowchart of a process in the SW unit 102 upon receiving a multicast packet. The process illustrated in FIG. 17 is started when a multicast packet is input to the SW unit 102. Although the agent of the process illustrated in FIG. 17 is the SW unit 102, the process will be described below taking the first forward port determination unit 13, which is a functional component of the SW unit 102, as the agent.

In OP41, the first forward port determination unit 13 retrieves information on the same VLAN as the VLAN to which the multicast packet belongs from the VLAN management table 23. When the multicast packet is received from the L3SW, the VLAN to which the multicast packet belongs is obtained from, for example, the VLAN to which the receiving port belongs. When the multicast packet is received from another L2SW 1, the VLAN to which the multicast packet belongs is obtained from the VLAN tag added to the multicast packet, for example. The process then continues to OP42.

In OP42, the first forward port determination unit 13 determines whether there is any port that belongs to the same VLAN as the multicast packet other than the receiving port or not. If there is no port that belongs to the same VLAN as the multicast packet other than the receiving port (OP42: NO), the process continues to OP46. In OP46, the first forward port determination unit 13 discards the multicast packet. The process illustrated in FIG. 17 then ends.

If there is a port that belongs to the same VLAN as the multicast packet other than the receiving port (OP42: YES), the process continues to OP43. In OP43, the first forward port determination unit 13 retrieve the entry corresponding to the multicast address of the multicast packet in question from the multicast forward determination table 21. The process then continues to OP44.

In OP44, the first forward port determination unit 13 determines whether a forward port is registered in the entry taken from the multicast forward determination table 21 or not. If a forward port is registered in the obtained entry (OP44: YES), the process continues to OP45. In OP45, the first forward port determination unit 13 decides that the forward port registered in the entry is to be the forward port for the multicast packet, and outputs the multicast packet to the port transmission unit 14. The multicast packet is forwarded from the forward port. The process illustrated in FIG. 17 then ends.

If "discard" is registered in the "forward port" in the entry retrieved (OP44: NO), the process continues to OP46. In OP46, the first forward port determination unit 13 discards the multicast packet. The process illustrated in FIG. 17 then ends.

<Operation and Effects of the First Embodiment>

In the first embodiment, the route of the Join message is determined at the root SW by using a multicast reception request message and a multicast reception setting message, and the port that received the Join message in each L2SW 1 is designated as the forward port. Each L2SW 1 does not forward multicast packets for the corresponding multicast group from ports other than the designated forward port. This can suppress flooding of multicast packets by L2SWs. By suppressing flooding of multicast packets, impact on the bandwidth of lines can be reduced.

Additionally, in the first embodiment, each L2SW 1 does not forward Join and Prune messages from ports other than the RP connection port. This can suppress flooding of Join and Prune messages by L2SWs.

If the L2SW 1 as the root SW is connected with the L3SW serving as the RP, the L2SW 1 may be arranged as described below with regard to the Prune message receiving process (FIGS. 7 and 16C and the like) instead of being arranged as described in the first embodiment. The root SW is aware of the entire topology of the multicast distribution tree and is also able to ascertain L2SWs 1 to which an L3SW requesting forwarding of multicast packets is connected. Thus, when receiving a Prune message, the root SW determines whether or not there is any L3SW that is requesting forwarding of multicast packets for the corresponding multicast group other than the L3SW from which the Prune message is transmitted.

If there is an L3SW requesting forwarding of multicast packets for the corresponding multicast group other than the L3SW from which the Prune message is transmitted, the root SW does not forward the Prune message to the L3SW as the RP. This prevents the Prune message from reaching the L3SW as the RP, making the L3SW as the RP continue to forward multicast packets. In one aspect, flooding of multicast packets can be suppressed.

Although the route of a Join message is determined using a multicast distribution tree among L2SWs 1 according to TRILL in the first embodiment, this is not a limitation. The technique described in the first embodiment is also applicable to an L2SW network employing a protocol that logically constructs a tree structure among L2SWs.

Second Embodiment

In the second embodiment, L2SWs 1 individually determine the route for multicast packets without using the multicast reception request message and multicast reception setting message.

Figure 18:
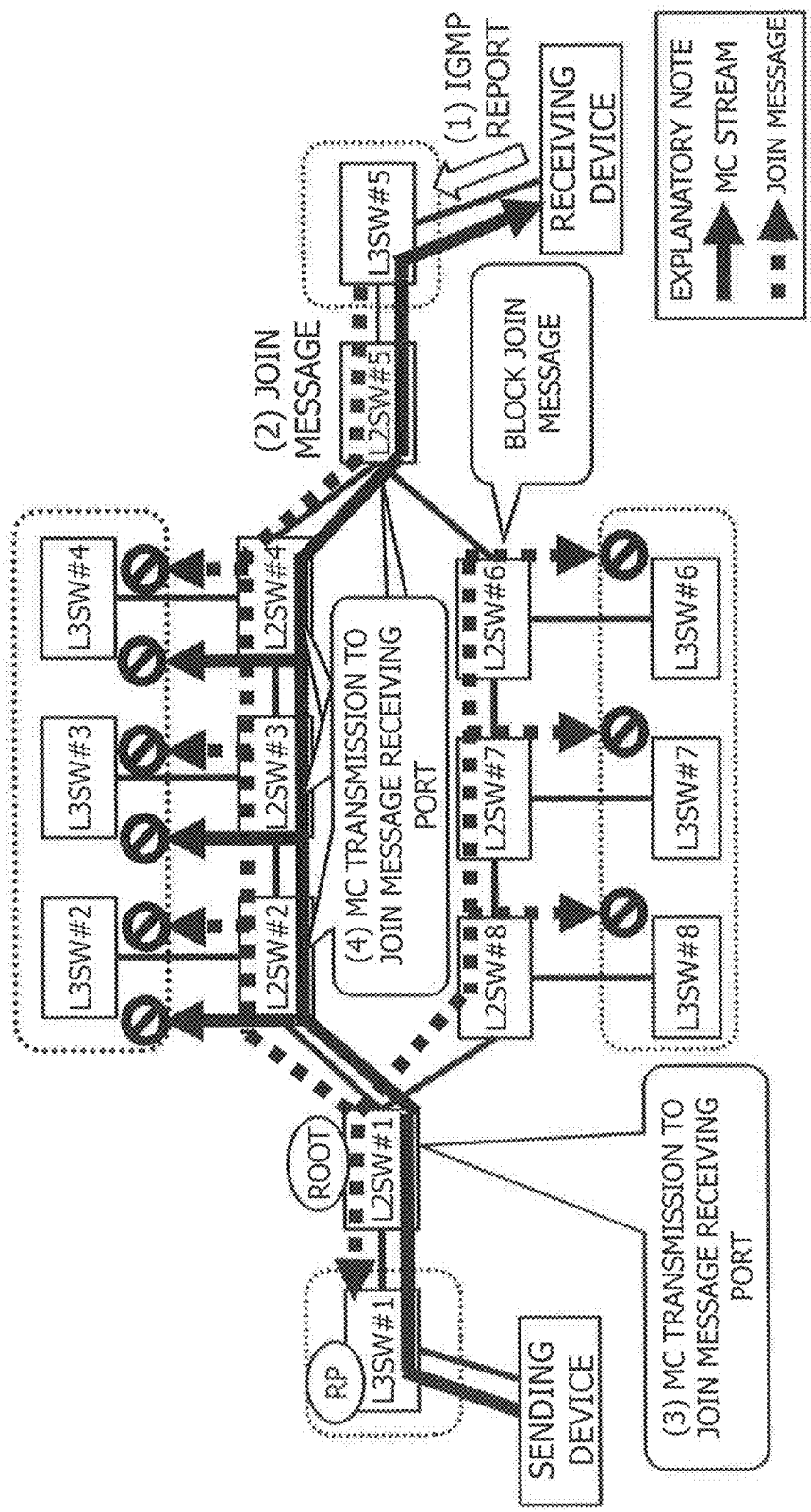
FIG. 18 is a diagram illustrating an exemplary flow of a process relating to distribution of multicast packets in a multicast network according to a second embodiment.

FIG. 18 is a diagram illustrating an exemplary flow of a process relating to distribution of multicast packets in a multicast network according to the second embodiment. The network illustrated in FIG. 18 has a similar structure to the networks illustrated in FIGS. 1 to 3.

(1) The receiving device below the L3SW #5 transmits an IGMP report in order to enter a multicast group.

(2) Upon receiving the IGMP report from the receiving device below, the L3SW #5 registers the receiving device as a destination to which relevant multicast packets will be distributed and also transmits a PIM Join message. As in the first embodiment, each L2SW forwards the Join message and Prune message to the RP connection port and does not forward them from the other ports also in the second embodiment.

In the second embodiment, after receiving the Join message, each L2SW sets the port at which the Join message is received as the forward port for the corresponding multicast group. Since the Join message is delivered up to the RP, the reverse direction to the route of the Join message is the route for multicast packets. The L2SWs therefore can determine that the port at which the Join message is received is to be the forward port for multicast packets.

(3) When a multicast packet is transmitted by the sending device, each L2SW forwards the multicast packet from the forward port for the corresponding multicast group and does not forward the multicast packet from the other ports. The second embodiment thus suppresses flooding of multicast packets.

Note that in the second embodiment, when a Prune message is received, the L2SW determines that the port at which the Prune message is received is to be a discard port. If there is a forward port other than the receiving port of the Prune message, however, the L2SW transmits a Join message by proxy so as to prevent discontinuation of multicast packet transfer at the RP as in the first embodiment.

The hardware and functional configurations of the L2SW 1 in the second embodiment are similar to the first embodiment. Differences from the first embodiment will be described below.

In the second embodiment, Join and Prune messages are input to the second forward port determination unit 15 from the packet determination unit 12. When receiving a Join message or a Prune message, the second forward port determination unit 15 instructs the table management unit 16 to update the multicast forward determination table 21. Furthermore, if there is a forward port for the corresponding multicast group other than the receiving port of the Prune message, the second forward port determination unit 15 instructs the message creation unit 17 to create a Join message.

The table management unit 16 updates the multicast forward determination table 21 as instructed by the second forward port determination unit 15. The table management unit 16 also monitors reception of a Join message at each forward port in the second embodiment. When a Join message is received, the table management unit 16 sets the aging timer of the entry in the multicast forward determination table 21 that corresponds to the Join message to the initial value.

When the aging timer has reached 0, the table management unit 16 sets the "forward port" in the corresponding entry of the multicast forward determination table 21 to "discard".

Figure 19:
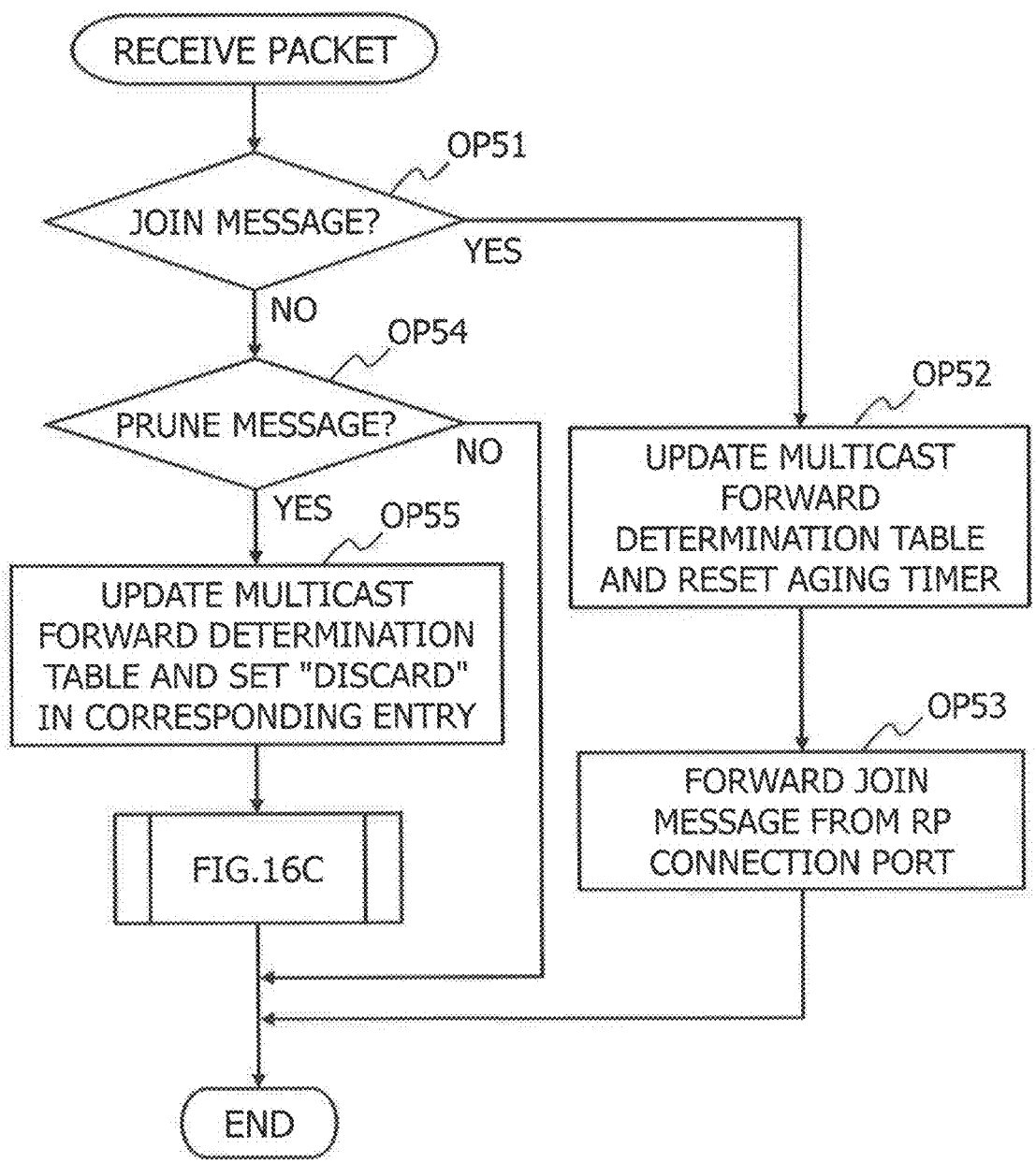
FIG. 19 is an exemplary flowchart of a process in the control unit when a packet is input to the control unit in the second embodiment.

FIG. 19 is an exemplary flowchart of a process in the control unit 101 when a packet is input to the control unit 101 in the second embodiment. The process illustrated in FIG. 19 is started upon input of a packet to the control unit 101. In the second embodiment, Join and Prune messages are input to the control unit 101 by the SW unit 102.

The process of FIG. 19 is carried out by the CPU 101A of the control unit 101 executing the multicast forward program stored in the memory 101B. Although the agent of the process illustrated in FIG. 19 is the CPU 101A of the control unit 101, the process will be described below by taking the second forward port determination unit 15, table management unit 16, and message creation unit 17, which are functional components of the control unit 101, as the agents.

In OP51, the second forward port determination unit 15 determines whether the packet input from the packet determination unit 12 is a Join message or not. If the packet input from the packet determination unit 12 is a Join message (OP51: YES), the process continues to OP52.

OP52 and OP53 are processing for when a Join message is input. In OP52, the second forward port determination unit 15 instructs the table management unit 16 to update the multicast forward determination table 21.

If the combination of the multicast address and the receiving port of the Join message is not registered in the multicast forward determination table 21, the table management unit 16 newly registers an entry. If the combination of the multicast address and the receiving port of the Join message is registered in the multicast forward determination table 21, the aging timer of the corresponding entry is set to the initial value. The process then continues to OP53.

In OP53, the second forward port determination unit 15 decides that the RP connection port is to be the forward port for the Join message and outputs the Join message to the packet transmission unit 14. The Join message is forwarded from the RP connection port. The process illustrated in FIG. 19 then ends.

If the packet input from the packet determination unit 12 is not a Join message (OP51: NO), the process continues to OP54. In OP54, the second forward port determination unit 15 determines whether the packet input from the packet determination unit 12 is a Prune message or not. If the packet input from the packet determination unit 12 is a Prune message (OP54: YES), the process continues to OP55. If the packet input from the packet determination unit 12 is not a Prune message (OP54: NO), the process illustrated in FIG. 19 ends.

In OP55, the second forward port determination unit 15 instructs the table management unit 16 to update the multicast forward determination table 21. The table management unit 16 sets the "forward port" to "discard" in the entry of the multicast forward determination table 21 that corresponds to the combination of the multicast address and receiving port of the Prune message.

After this, the process illustrated in FIG. 16C is carried out. Specifically, the Prune message is forwarded from the RP connection port and the message creation unit 17 creates and transmits a Join message if there is a forward port other than the receiving port of the Prune message. The process illustrated in FIG. 19 then ends.

Processing performed when a multicast packet is received is similar to the process illustrated in FIG. 17 described in the first embodiment.

<Operational Effects of the Second Embodiment>

In the second embodiment, each L2SW sets the port at which a Join message has been received as the forward port for the corresponding multicast group and does not forward multicast packets from ports other than the forward port. This can suppress flooding of multicast packets.

In addition, since the second embodiment does not employ the multicast reception request message and multicast reception setting message, packets used for suppressing multicast flooding can be reduced.

In another aspect, the present invention provides a packet transmission apparatus as the second communication apparatus in the aforementioned network system. In another aspect, the present invention provides a packet transmission method for the second communication apparatus in the aforementioned network system to carry out the aforementioned process. In yet another aspect, the present invention provides a program for causing a computer to function as the aforementioned second communication apparatus and a computer-readable non-transitory recording medium having the program recorded therein. Non-transitory recording media readable by a computer and the like refer to recording media that can store information such as data and programs by electric, magnetic, optical, mechanical, or chemical actions and allows the information to be read by a computer and the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network system comprising:
   a plurality of first communication apparatuses configured to perform multicast routing; and
   a plurality of second communication apparatuses configured to connect between the plurality of first communication apparatuses and forward a multicast packet from a port other than a receiving port,
   wherein each one of the plurality of second communication apparatuses comprises:
   a memory configured to store correspondence with a forwarding port and a multicast address of a multicast group, the forwarding port at which a join request for joining the multicast group has been received and from which multicast packets for that multicast group is forwarded, the join request sent by one of the plurality of first communication apparatus; and
   a forwarding unit configured to forward the multicast packet for the multicast group from the forwarding port corresponding to the multicast address used by the multicast group among the ports of the second communication apparatus,
   wherein the memory is configured to store an address of one of the first communication apparatuses that serves as a rendezvous point of a multicast distribution tree,
   wherein the second communication apparatus further comprises a determination unit configured to determine that a first port among the ports of the second communication apparatus is a port from which the join request is forwarded, the first port connected to the rendezvous point, and
   wherein
   when a withdrawal request to withdraw from the multicast group is received from one of the first communication apparatuses,
   the determination unit of the second communication apparatus determines that the first port among the ports of the second communication apparatus is a port from which the withdrawal request is forwarded, and
   when a forwarding port for the multicast group indicated by the withdrawal request is stored in the memory other than a port at which the withdrawal request is received, decides to create and transmit an join request for the multicast group.

2. A network system comprising:
   a plurality of first communication apparatuses configured to perform multicast routing; and
   a plurality of second communication apparatuses configured to connect between the plurality of first communication apparatuses and forward a multicast packet from a port other than a receiving port,
   wherein each one of the plurality of second communication apparatuses comprises:
   a memory configured to store correspondence with a forwarding port and a multicast address used by a multicast group, the forwarding port at which a join request for joining the multicast group has been received and from which multicast packets for that multicast group is forwarded, the join request sent by one of the plurality of first communication apparatus; and
   a forwarding unit configured to forward the multicast packet for the multicast group from the forwarding port corresponding to the multicast address used by the multicast group among the ports of the second communication apparatus,
   wherein the memory is configured to store information on a logical tree structure constructed according to a predetermined protocol among the plurality of second communication apparatuses,
   wherein the second communication apparatus further comprises a message creation unit configured to, when the join request is received by the second communication apparatus, notify another second communication apparatus that is a root of the tree structure about a receiving port at which the join request is received; and
   when the second communication apparatus is the root, determine a route of the join request based on information on the tree structure stored in the memory, and provides each of the plurality of second communication apparatuses with a notification that the receiving port of the second communication apparatus is a forwarding port for the multicast group, wherein the receiving port of the second communication apparatus is on the determined route,
   wherein the message creation unit provides a notification of a port which is not on the determined route as a discard port from which a packet for the multicast group is not forwarded; and
   wherein
   the message creation unit provides a notification of the receiving port at predetermined intervals, and
   when the notification of the receiving port is not received for a predetermined period of time at the forwarding port stored in the memory, the message creation unit notifies each of the plurality of second communication apparatuses that all ports are to be discard ports for the multicast group.

3. A network system comprising:
   a plurality of first communication apparatuses configured to perform multicast routing; and a plurality of second communication apparatuses configured to connect between the plurality of first communication apparatuses and forward a multicast packet from a port other than a receiving port, wherein each one of the plurality of second communication apparatuses comprises:

a memory configured to store correspondence with a forwarding port and a multicast address used by a multicast group, the forwarding port at which a join request for joining the multicast group has been received and from which multicast packets for that multicast group is forwarded, the join request sent by one of the plurality of first communication apparatus; and a forwarding unit configured to forward the multicast packet for the multicast group from the forwarding port corresponding to the multicast address used by the multicast group among the ports of the second communication apparatus, and wherein the second communication apparatus further comprises a management unit configured to store a port at which the join request is received as the forwarding port for the multicast group in the memory, and when the join request is not received for a predetermined period of time at the forwarding port stored in the memory, the management unit changes the port being stored as the forwarding port to a discard port from which a packet for the multicast group is not forwarded.

4. A packet transmission apparatus that connects between a plurality of first communication apparatuses performing multicast routing and forwards a multicast packet from a port other than a receiving port, comprising:

a memory configured to store correspondence with a forwarding port and a multicast address used by a multicast group, the forwarding port at which a join request for joining the multicast group has been received and from which multicast packets for that multicast group is forwarded, the join request sent by one of the plurality of first communication apparatus; and a forwarding unit configured to forward the multicast packet for the multicast group from the forwarding port corresponding to the multicast address used by the multicast group among ports of the packet transmission apparatus, wherein the memory is configured to store an address of one of the first communication apparatuses that serves as a rendezvous point of a multicast distribution tree, wherein the packet transmission apparatus further comprises a determination unit configured to determine that a first port among the ports of the packet transmission apparatus is a port from which the join request is forwarded, the first port connected to the rendezvous point, and wherein when a withdrawal request to withdraw from the multicast group is received from one of the first communication apparatuses, the determination unit determines that the first port among the ports of the packet transmission apparatus is a port from which the withdrawal request is forwarded; and when a forwarding port for the multicast group indicated by the withdrawal request is stored in the memory other than a port at which the withdrawal request is received, decides to create and transmit an join request for the multicast group.

* * * * *